(12) United States Patent
Dillon

(10) Patent No.: US 6,231,183 B1
(45) Date of Patent: May 15, 2001

(54) OPTICAL LENS STRUCTURE AND METHOD OF FABRICATION THEREOF

(76) Inventor: Stephen M. Dillon, 8009 E. Dillon's Way, Scottsdale, AZ (US) 85260-1809

( * ) Notice: Subject to any disclaimer, the term of this patent is extended or adjusted under 35 U.S.C. 154(b) by 0 days.

(21) Appl. No.: 09/348,145

(22) Filed: Jul. 6, 1999

(51) Int. Cl.[7] ................................................. G02C 7/10
(52) U.S. Cl. .............................. 351/163; 351/44; 351/166
(58) Field of Search ..................................... 351/159, 163, 351/164, 165, 166, 41, 44; 359/15, 19

(56) References Cited

U.S. PATENT DOCUMENTS

| | | | |
|---|---|---|---|
| 4,315,665 | 2/1982 | Haines | 350/3.61 |
| 4,715,702 | 12/1987 | Dillon | 351/44 |
| 4,840,444 | 6/1989 | Hewitt | 350/3.85 |
| 4,873,029 | 10/1989 | Blum | 264/1.3 |
| 4,934,792 | 6/1990 | Tovi | 350/320 |
| 5,073,009 | 12/1991 | Tovi | 359/601 |
| 5,147,585 | 9/1992 | Blum | 264/1.4 |
| 5,219,497 | 6/1993 | Blum | 264/1.4 |
| 5,432,623 | * 7/1995 | Egan et al. | 359/15 |
| 5,464,710 | 11/1995 | Yang | 430/1 |
| 5,512,371 | 4/1996 | Gupta et al. | 428/412 |
| 5,702,819 | 12/1997 | Gupta et al. | 428/412 |
| 5,757,459 | 5/1998 | Bhalakia et al. | 351/168 |
| 6,020,983 | * 2/2000 | Neu et al. | 359/14 |

* cited by examiner

Primary Examiner—Scott J. Sugarman
(74) Attorney, Agent, or Firm—William E. Hein

(57) ABSTRACT

An improved method for creating a multi-layered optical lens structure which appears, from an observer's point of view, to have a brushed metal finish, matte finish, decorative pattern, image or logo on the surface of a sunglass lens, but which is optically transparent from a wearer's point of view. The present method for creating a lens structure does not require the use of epoxies or adhesives and allows the lens structure to be made as a polarized lens. The present method offers vast improvements over previously disclosed methods in that it simplifies assembly of the lens structure, allows for greater repeatability, and significantly improves the optical clarity of the final lens structure.

104 Claims, 21 Drawing Sheets

OPTICAL LENS STRUCTURE AND METHOD OF FABRICATION THEREOF

BACKGROUND OF THE INVENTION

The present invention relates to an optical lens structure and a means of manufacturing the same wherein the optical lens reflects light in a manner that is scattered while allowing a portion of the light striking the lens surface to pass through the lens in a coherent manner similar to that of a conventional eyeglass lens.

The basic theory behind a lens structure of this type is simply that a transparent medium, such as a window pane, will transmit light in a coherent or undistorted manner provided that both surfaces of the window pane, which are perpendicular to the light rays, are optically smooth and parallel to one another. If, however, one of the two surfaces is not optically smooth, that is to say, etched, scratched or sculptured in some manner, the light passing through the transparent medium will be distorted. Generally speaking, the more the surfaces are etched, the more the transmitted light will be distorted. This basic phenomena is commonly applied to the design glass of acrylic shower doors in which one side of the glass is typically textured while the other side remains smooth, the result being that an observer cannot clearly see through the shower door.

The texturing of the shower door, as described above, causes the light to be distorted simply because the refractive index of the transparent medium, such as glass, is different than that of air. In other words, the speed at which light travels through air is different than the speed at which light travels through glass. The fact that the speed of light will change as a function of the medium through which it is traveling is pertinent in that, on a microscopic level, as the light rays pass through an uneven surface of one transparent medium, the light rays will exit that transparent medium at slightly different times. This will cause the light rays that were previously moving together at the same rate to change speeds at slightly different times, in turn causing the light rays to become scattered.

A textured surface, as described above, is in effect made up of peaks and valleys. Such a surface is commonly referred to as a "relief pattern." It is those peaks and valleys that cause the once coherent light rays to exit the transparent medium at different times, resulting in distortion. If another transparent medium, such as a liquid, for instance, having exactly the same refractive index as the glass, is applied to the textured surface of the glass (the side opposite the textured side of the glass being optically smooth), such that the liquid fills in the peaks and valleys of the textured surface, in turn providing an optically smooth surface, the light will once again pass through without distortion. If the refractive index of the liquid is the least bit different than that of the glass, the light will remain distorted. The degree to which the light remains distorted is directly proportional to the mismatch in refractive indices between the glass and the liquid. For example, water on the etched surface of a shower door will cause the door to become more transparent yet not as clear as a window pane, for example. The shower door does not become perfectly clear basically because water does not have the same refractive index as glass. However, the refractive index of water is closer to that of glass than the refractive index of air is to glass, and that is why the door becomes more clear. It is important to note that nearly every different type of transparent medium will have a unique refractive index.

Consider again a light transmitting substrate in which a first side of the substrate is opticaly smooth and a second side is textured. If a vacuum deposited reflective type coating, like the type of coatings used to create a mirrored sunglass lens, is applied to the textured side of the light transmitting substrate, the reflective coating will highlight the textured surface. Consider now an optically clear liquid applied to the reflective coated textured surface in which the liquid fills in the peaks and valleys of the textured surface and is made to provide a new surface which is optically smooth and parallel to the first side of the substrate. If the liquid has exactly the same refractive index as the transparent substrate, the newly constructed multi-layered substrate will once again allow light to pass through undistorted. At the same time, the reflective coating, which is sandwiched between the liquid and the substrate, will highlight the textured surface.

When creating an optical system such as this, the refractive index of the reflective coating does not need to be the same as the other light transmitting materials for two reasons. First, the reflective coating is very thin, in the order of angstroms. Second, it has, for all practical purposes, an even thickness at all points across the surface. Because of the reflective coating's substantially uniform thickness, the optically clear liquid can very closely, if not perfectly, match the textured surface of the substrate. Because it is very thin, the optically clear liquid can come within angstroms of contacting the textured surface of the substrate. As a result of these two conditions, light is able to pass through the reflective coating practically undisturbed.

By observing these basic principals, an optical lens, such as used for sunglasses, can be made in such a way as to reflect light in a scattered manner, while at the same time transmit light in a coherent manner. Such a lens is advantageous in that on the face of an eyeglass lens, decorative patterns, images, logos, etc. can be made apparent to an observer while presenting no adverse affect to the wearer of the lens.

U.S. Pat. No. 4,315,665 describes an optical lens structure comprised of a first transparent layer that has a relief pattern on one surface, a reflective coating applied to the relief pattern, and a second transparent layer applied to the reflective coating. The second transparent layer is described as being applied in a manner that fills in the surface variations of the reflective coated relief pattern. The objective of the three-layer structure is to reflect a portion of incident light in the form of an image created by the relief pattern, while allowing the remainder of the incident light to pass undistorted. The reference further teaches that the first and second transparent layers are to have substantially the same refractive index. This reference is silent, however, as to the means by which this is to be accomplished. More specifcally, it does not teach any method by which the second transparent layer, having a similar refractive index as the first transparent layer, is adhered to the reflective coating. With regard to matching refractive indices, as described, the problem encountered is that lens elements that serve as structural substrates, such as thermo or thermoset plastics, typically do not have the inherent capability to adhere to materials such as those typically employed as reflective coatings. Therefore, to create a lens structure of the type described in this prior art reference, manufacturers typically rely on adhesives or epoxies to bond a second preformed transparent layer to the reflective coating. The term "preformed" relates to the idea of the transparent layer being a solid state substrate, such as a sheet of plastic, wherein the sheet is adhered to the adhesive by means of lamination.

The foregoing reference describes holography as being a suitable means for creating a surface relief pattern that will reflect images and or decorative light patterns. Moreover, holography is described as being the method of choice. Today, eyeglasses with holographic images on the eyeglass lenses are commonly available. These types of eyeglasses are typically considered to be novelty items. Adhesives are typically employed in manufacturing the holographic lenses used in these eyeglasses. An adhesive is applied to the surface of the reflective coating to facilitate transmission of light through the lens as well as to provide a binary layer to which an additional preformed transparent layer can be applied. The additional preformed transparent layer protects the adhesive, the reflective coating, and the holographic relief pattern upon which the reflective coating is applied. The problem encountered when incorporating adhesives or epoxies, as described, is that bonding elements inherently cause optical distortion. The resulting distortion of light is directly proportional to the degree to which the surface of the substrate, upon which the adhesive or epoxy is applied, is textured or contoured. The descriptive terms "textured" and "contoured" are in reference to prior art in which surface relief patterns and surface variations are described. The main reason the bonding elements cause optical distortion is because of a mismatch in refractive indices. The material used to create the first transparent layer, having the surface relief pattern thereon, is not the same type of material used to bond the elements together. Because the materials are not the same, for all practical purposes, there will always be a mismatch in refractive indices. The reason the mismatch is a problem is because the bonding element is the material used to fill in the peaks and valleys of the surface relief pattern. If the surface relief pattern is created by holographic means, the subject of mismatched refractive indices is less of a problem. This is because the peaks and valleys comprising the surface variations typically have a depth of about 0.5 to 1.0 microns. As previously mentioned, the distortion due to a mismatch in refractive indices is directly proportional to the degree to which the surface of the substrate, upon which the adhesive or epoxy is applied, is textured or contoured. That is, the less the surface is altered, the less light will be distorted when passing through the altered surface, and the less the bonding element will have to work to restore the direction of the distorted light rays. Nevertheless, sunglasses incorporating holographic lenses historically have exhibited very poor optical clarity. This, more than anything else, is why holographic sunglasses are considered to be novelty items.

U.S. Pat. No. 5,464,710 describes a holographic sheet construction that can be utilized as an eyeglass lens. The manner in which the sheets are assembled is very similar to the methods described above in which an adhesive is applied. In another embodiment described in this reference, an acrylate type material is applied to the reflective coating instead of using a preformed transparent layer to protect both the adhesive and the reflective coating. The acrylate coating is taught to be approximately 1.5 to 5.0 microns thick, which is just thick enough to fill in the peaks and valleys of the surface relief pattern. The top coat is taught to serve as a protective coating for the reflective coating as with the adhesive coating. The same problem exists with the acrylate protective coating, that is, the material used to create the substrate, described as a polyester substrate, upon which the surface relief pattern is applied, is not the same as the material used to create the protective coating.

U.S. Pat. No. 4,934,792 to Tovi, describes a lens structure similar to those of the prior art previously described. This reference teaches a first lens element having a surface relief pattern on one surface, a reflective medium applied to the surface relief pattern, and a second lens element applied to the reflective coating. The second lens element is described as having a refractive index substantially similar to the first lens element. The only method taught for adhering the second lens element to the reflective coating is by means of an adhesive. The use of an adhesive, however, would negate any advantage gained by ensuring that the second lens element has a refractive index similar to that of the first lens element. Because the adhesive is between the reflective medium and the second lens element, the second lens element is displaced from the reflective coated relief pattern. The second lens element is displaced by the adhesive layer because the adhesive layer will fill in the peaks and valleys of the reflective coated relief pattern. This reference does, however, recognize this inherent problem in stating that such a method would not be practical if the refractive index of the adhesive cannot be matched to the refractive index of the other lens elements. To further complicate the problem of optical distortion, as previously described, the surface relief patterns described in this reference have peaks and valleys that far exceed the depth of those created by holographic relief patterns. As an example of a relief pattern, Tovi teaches use of the face of a coin, such as a silver dollar, against which a plastic material is cast. The resulting distortion of light created by such a relief patterns is far greater than that created by a holographic image. Therefore, it would be anticipated that the resulting optical clarity of such a lens structure would be worse than that of a holographic type lens structure of the type previously described.

U.S. Pat. No. 5,073,009, also to Tovi, suggests an alternative method of construction of a lens structure in which a first layer of plastic or adhesive material is cast upon a preformed transparent lens element. It is suggested that the plastic or adhesive material be a type that can be poured, such as polycarbonate, acrylic or polyester. The surface of the plastic or adhesive material, opposite the first preformed transparent lens element, has a surface relief pattern thereon. The nature of the adhesive or plastic material is such that it adheres to the first lens element. The surface relief pattern, such as the face of a coin, against which the plastic or adhesive material is cast, is covered with metal foil. After the first layer of adhesive or plastic material has cured, the metal foil is removed from the surface, revealing the surface relief pattern of the coin. A reflective coating, such as a thin layer of aluminum, is then applied to the surface of the relief pattern. A second layer of plastic or adhesive material, similar to that used to create the first layer of plastic or adhesive, is then poured onto the reflective coating. Prior to curing the second plastic or adhesive layer, a second preformed transparent lens element is pressed against the uncured plastic or adhesive layer, thereby creating a sandwiched lens structure. Tovi does not specifically teach how the elements of the lens structure are bonded together. For example, it is stated that the plastic or adhesive material used to create the first layer is to be similar to the plastic or adhesive material that is poured onto the reflective coating. If the second layer of adhesive or plastic material is capable of bonding to the aluminum reflective coating, it would be anticipated that the plastic or adhesive material, used to create the first layer, would bond to the object providing the surface relief pattern, such as the metal foil. Nevertheless, this method of construction is overly complex and not suitable for a production environment.

U.S. Pat. No. 4,715,702 to the present inventor describes a decorative lens that includes a reflective mirror type coating sandwiched between two decoratively printed light transmitting substrates. The idea is to print a first transparent colored pattern onto a clear substrate and then apply a semi-transparent mirror coating over the printed pattern. A second transparent colored pattern is printed over the top of the mirror coating. The second pattern is a negative of the first pattern. The objective of the second printed pattern is to cancel the pattern created by the first printed pattern. In the final lens structure, the reflective coating highlights the un even texture of the printed decorative pattern. The resulting textured finish of the reflective coating gives the lens a favorabley unique appearance from an observer's point of view, while being relatively transparent from the wearer's point of view. The final lens structure, however, tends to distort transmitted light and, therefore, does not exhibit the optical quality of a conventional lens. It has been subsequently determined that the light was distorted because the refractive index of the transparent decorative pattern was different than the refractive index of the adhesive that was used to hold the multilayer lens structure together. At this point, it became apparent that an improved method of construction of a lens with a textured coating was needed, that is, a method that would not inherently cause distortion.

With regard to holographic eyeglasses, the manner in which the images are made visible is by reflecting different colors in the form of the given image. Prior art holographic eyeglasses all have, for the most part, one thing in common, eyeglass lenses that brightly reflect images and or objects. For example, holographic eyeglasses that reflect images of steel nails, eyeballs, broken glass, skulls and faces are some of the most common types. U.S. Pat. Nos. 5,073,009 and 4,934,792 describe surface relief patterns depicting the face of a coin and patterns created from photographs. U.S. Pat. No. 4,715,702 teaches the creation of images of stars, circles, and stripes. In accordance with the present invention, a more aesthetically pleasing lens structure can be implemented by creating a lens that reflects light but does not reflect an image. The present invention describes lens structures, and methods of making the same, that are not only optically superior to those of the prior art, but considered to be more aesthetically appealing to consumers.

U.S. Pat. No. 4,873,029 describes a tinted plastic lens having a plastic protective coating applied to the surface(s) thereof. The objective of the protective plastic coating is to protect the tint from abrasion. Also, the plastic layer is described as being useful for creating prescription multi-focal lenses. A pretinted lens element, referred to as a wafer, is placed inside a mold cavity that is larger than the wafer. The mold cavity is then filled with a liquid monomer. The liquid monomer is cured by heat, thereby forming a protective layer over the lens wafer. In another embodiment, a tinted plastic lens has a plastic coating cast onto one surface of the first lens. As before, the plastic coating is employed to protect the tint from abrasion as well as to provide a prescription or multi-focal element. U.S. Pat. Nos. 5,147,585 and 5,219,497 describe methods of creating multi-focal and progressive lenses by casting an additional plastic element onto one surface of a preformed plastic lens and curing the additional plastic element by both heat and ultraviolet light. U.S. Pat. Nos. 5,512,371 and 5,702,819 describe a multi-element lens structure combining a polycarbonate lens element with an allyl diglycol lens element wherein surface casting methods, similar to those described in U.S. Pat. Nos. 5,147,585 and 5,219,497 are used to create multi-focal lenses, progressive lenses or nonprescription lenses. The lenses taught in U.S. Pat. Nos. 5,147,585 and 5,219,497 combine the scratch resistance of allyl diglycol carbonate and the impact resistance of polycarbonate. These lenses relate to the lenses of the present invention only in that they employ additional lens elements formed on a preformed lens element. These prior art references do not describe the use of additional adhesion promoting elements, nor do they describe the use of reflective mediums. The function, appearance, and objectives of the lens structures disclosed in these references are not at all like the lens structure of the present invention.

U.S. Pat. No. 5,757,459 describes a method for forming a lens by injection molding a thermoplastic, referred to as the power portion, onto a multi-element laminated sheet structure. The power portion is taught to be a material such as polycarbonate, while the laminated sheet structure, which is referred to as a functional portion, is of a type that is polarized or photochromic. This reference teaches a lens that combines a thermoplastic lens form with a functional portion, wherein the lens can be fabricated as a semifinished lens, a prescription lens or a non-prescription lens. Ordinary acrylic epoxy, and urethane type adhesives are employed to create the function portion. These adhesives are incompatible with the method of the present invention. Furthermore, this prior art reference does not teach any type of reflective medium. The function, appearance, and objectives of the lens structure disclosed in this reference are not at all like the lens structure of the present invention.

SUMMARY OF THE INVENTION

The present invention is directed to a lens structure having a brushed metal appearance or a matte/sand blasted metal appearance from an observer's point of view, but which is optically transparent from the wearer's point of view. The present lens structure serves as a sunglass lens and is created in such a way that it reflects light but reflects almost no image. The method of the present invention can also be employed to create lenses that reflect almost any desired texture, logo or image, including holographic images. The present invention enables a lens structure to be fabricated as a polarized lens. The methods of the present invention not only facilitate fabrication of a lens structure having a brushed metal or sand blasted metal appearance, but make it possible to do so with very little degradation in the optical clarity of the lens structure. With reference to methods of construction described in the prior art, distortion due to a mismatch in refractive indices is directly proportional to the degree to which the surface of the substrate is textured or contoured. The surface variations resulting from relief patterns described in connection with the present invention are far more pronounced than conventional holographic relief patterns, yet the prior art methods are not capable of creating an optical quality lens structure of the type described herein.

In its most basic form, the lens structure of the present invention comprises a first lens element having first and second surfaces. The first surface includes a relief pattern in the form of a brushed or sandblasted finish. The second surface is opposite the first surface and is optically smooth. Light, transmitted through the first lens element, is distorted by the peaks and valleys of the brushed or sandblasted finish. A thin reflective medium is applied to the first surface. The reflective medium may be applied by well known vacuum deposition methods. The reflective medium is approximately 0.2 to 1.2 angstroms thick and may comprise chromium, for example. Depending on the thickness of the reflective material used, the reflective medium will reflect a portion of the total light striking the surface of the reflective medium and allow the remaining portion of light to pass through the lens element. The purpose of the reflective medium is to highight the peaks and valleys of the brushed or sandblasted finish of the first surface. A primer element of substantially uniform thickness is applied over the reflective medium. The primer element, which is only a few angstroms in thickness, bonds to the reflective medium. A second lens element having the same refractive index as the first lens element is applied over the primer element. The second lens element is applied in a manner that fills in the peaks and valleys created by the relief pattern of the first surface of the first lens element. The second lens element bonds to the primer element and creates a third surface opposite the second surface. The third surface is optically smooth and is, in essence, parallel to the second surface. The first and second lens elements comprise optical grade plastic. Scratch resistant and anti-reflective coatings are applied to the second and third surfaces of the multi-layer lens structure. The result is a lens structure that transmits light in a manner that is undistored while reflecting light in a manner that highlights the brushed or sandblasted finish.

This diagram is the fifth in a first series of illustrations showing the order in which the lens may be assembled.

Figure 2:
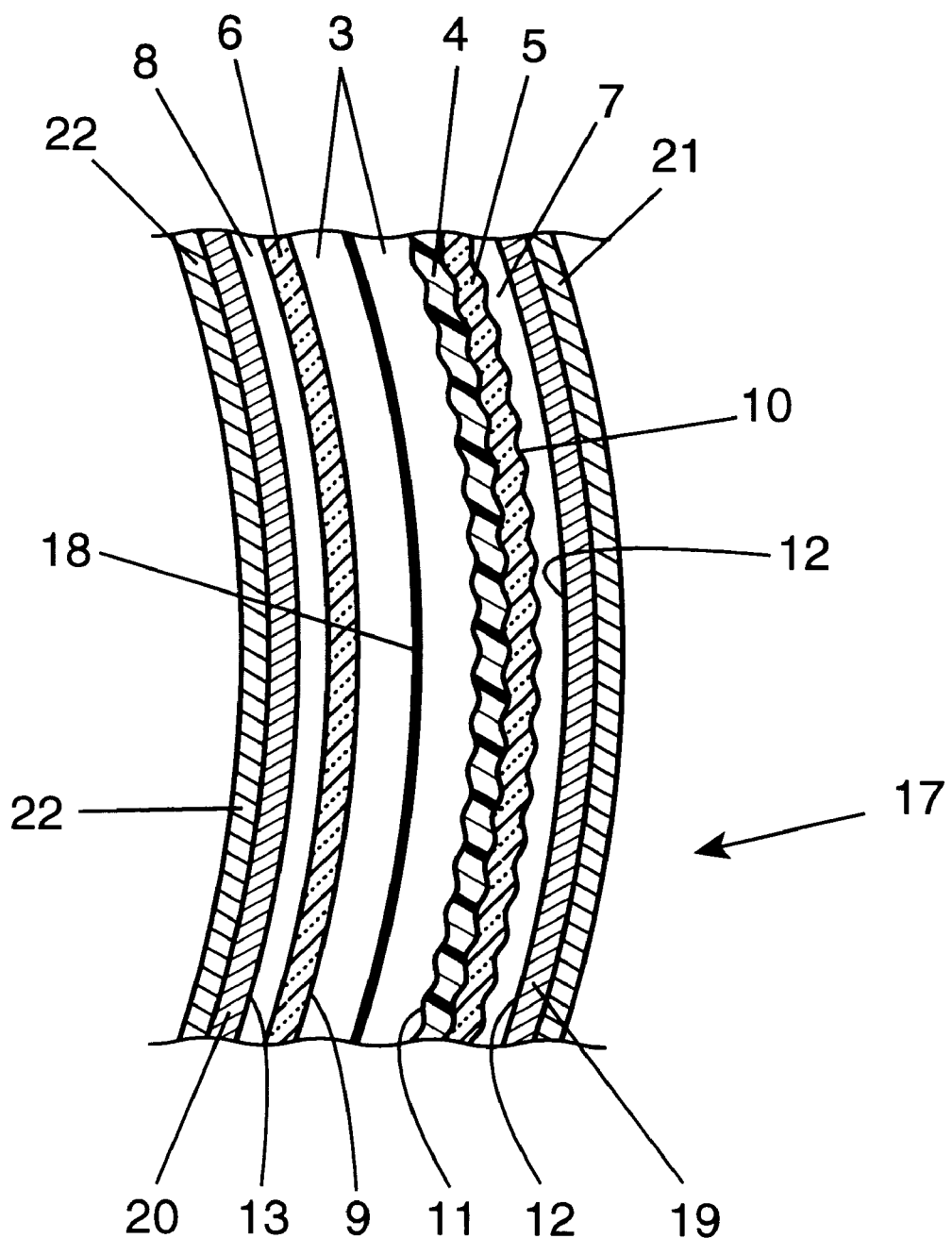
FIG. 2 is a cross-sectional diagram taken along the line 2—2 of the lens of FIG. 1B.
Figure 9:
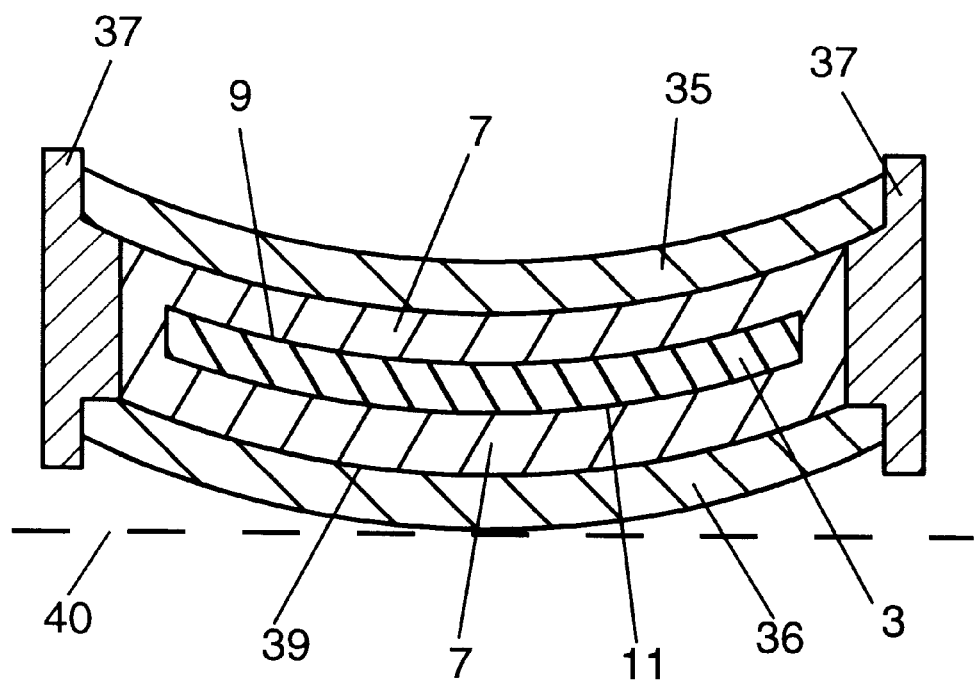
FIG. 9 is a cross-sectional diagram of the illustration depicted in FIG. 8 in which the mold assembly and lens are shown in assembled form.
Figure 10:
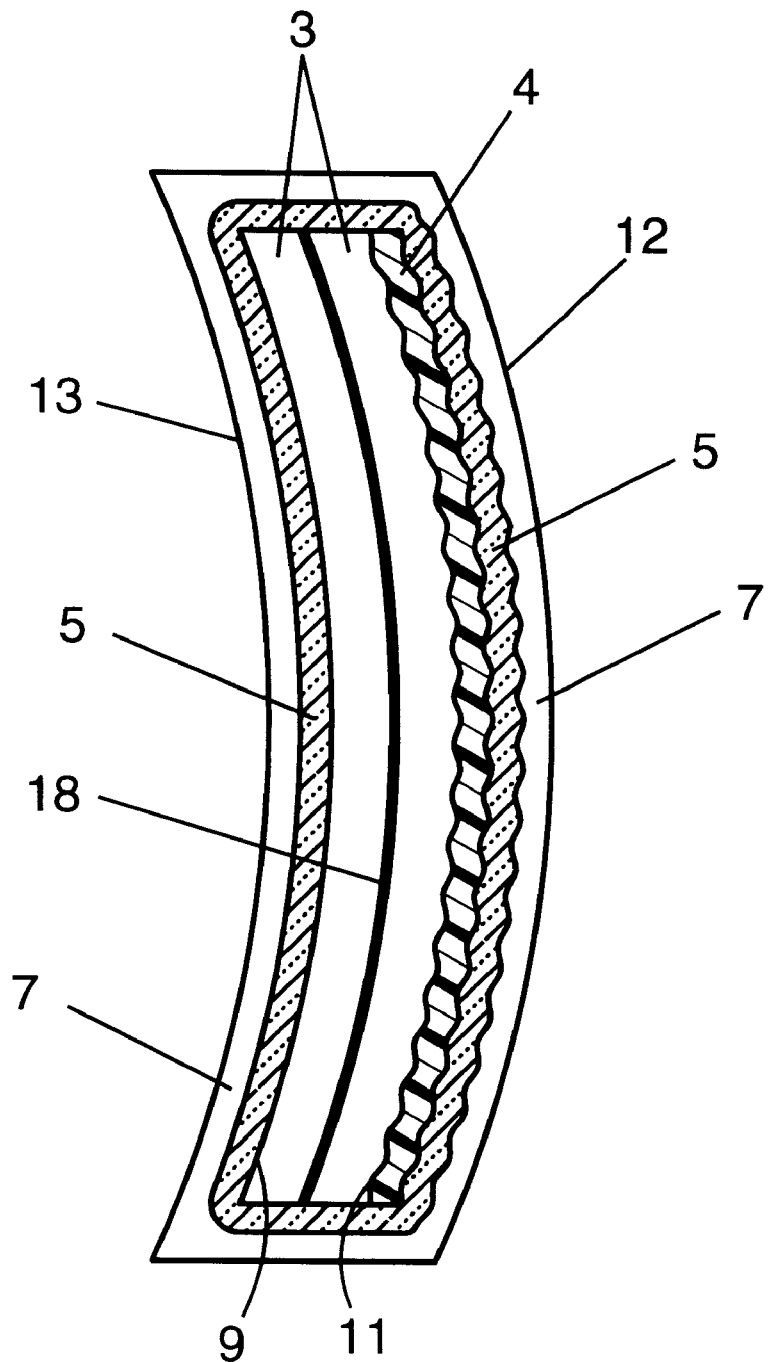

FIG. 10 is a cross-sectional diagram similar to FIG. 2 showing the lens of FIG. 9 after it is removed from the mold assembly. This diagram illustates an additional lens element applied to the lens as a result of having been placed inside a mold. This diagram is the sixth in a first series of illustrations showing the order in which the lens may be assembled.

Figure 11:
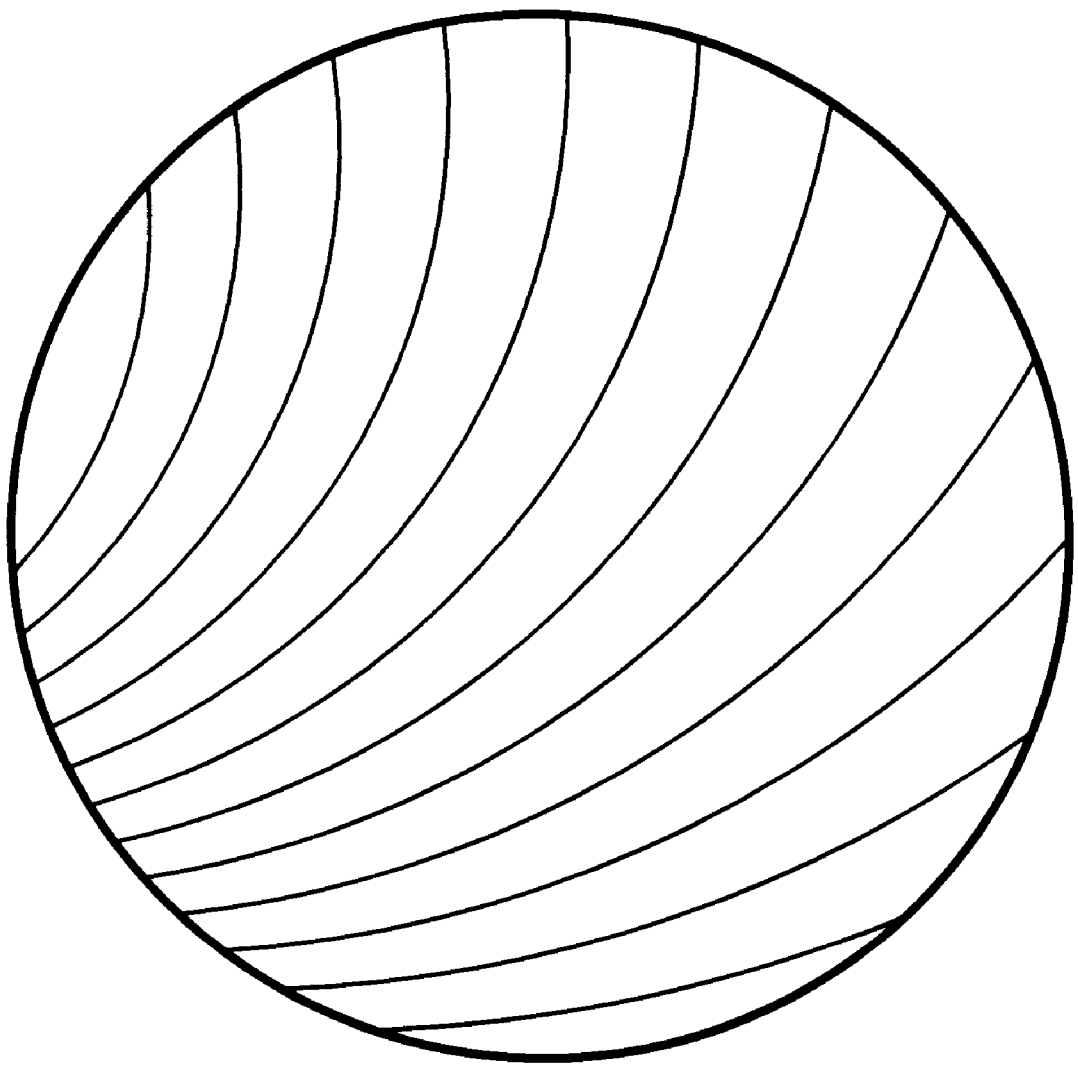

FIG. 11 is a frontal view of the lens depicted in FIG. 10.

Figure 12:
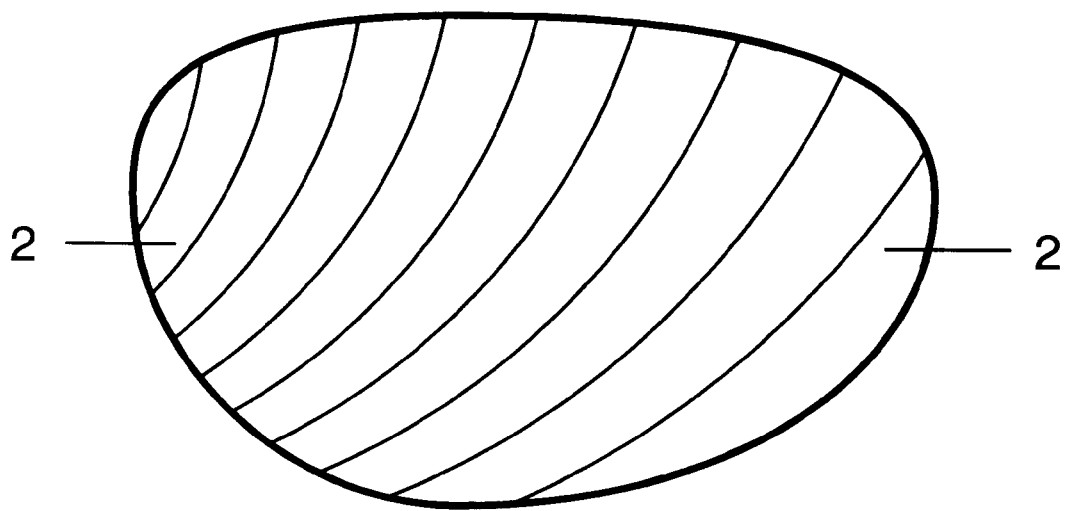

FIG. 12 is a frontal view of the lens depicted in FIG. 11 after being edged to a given shape.

Figure 13:
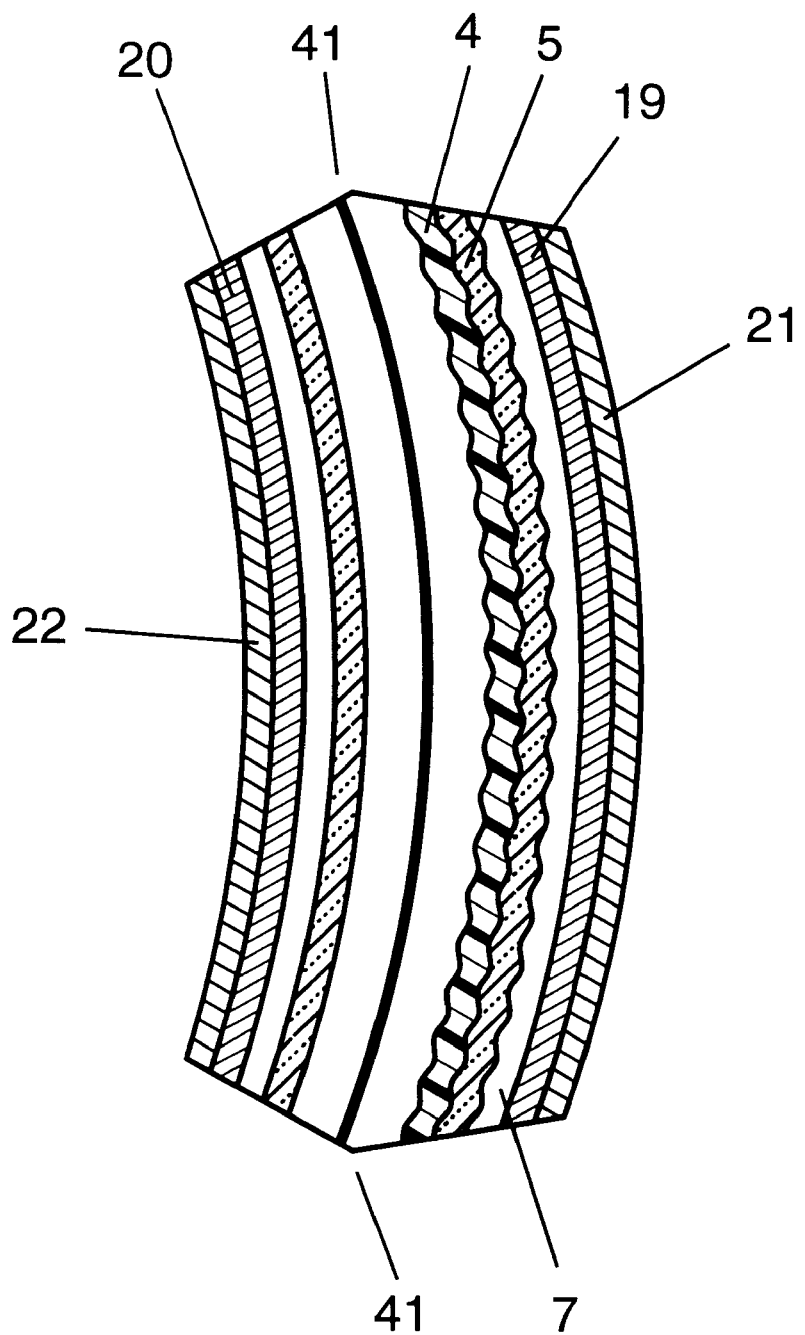

FIG. 13 is a cross-sectional diagram taken along the line 2—2 of the lens of FIG. 12.

Figure 14:
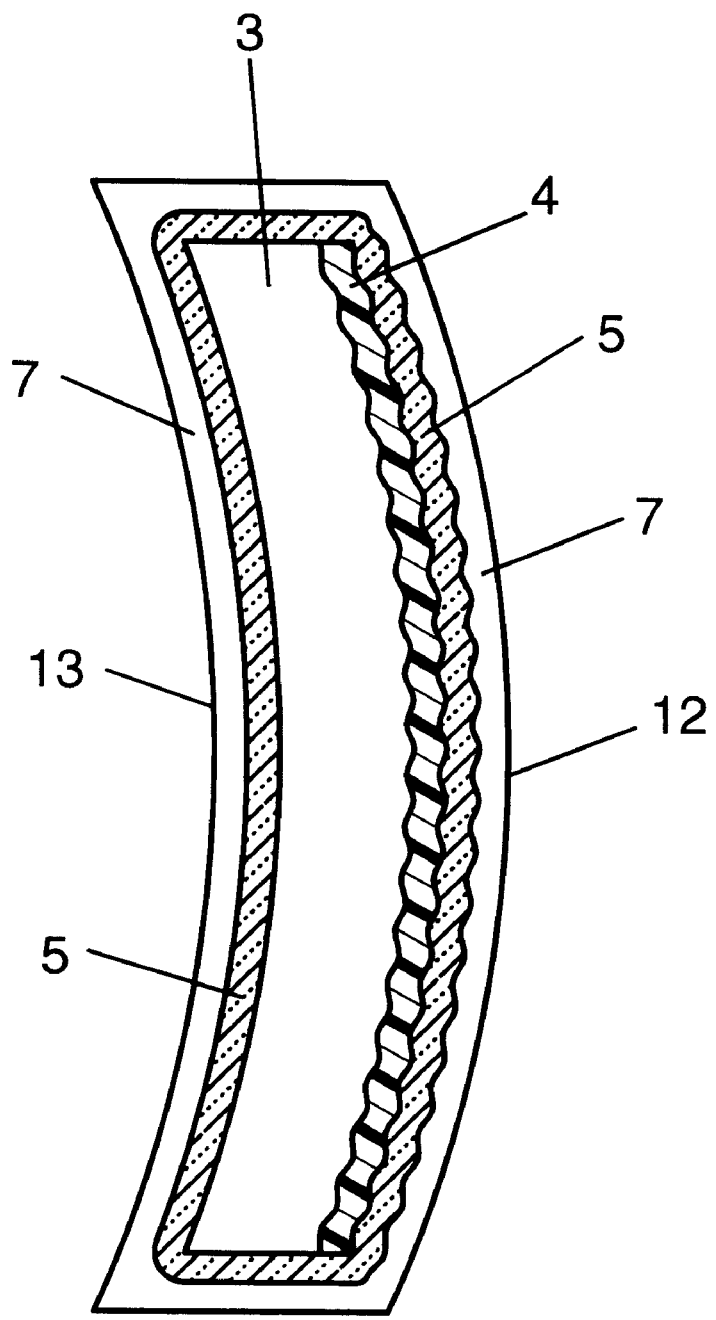

FIG. 14 is a cross-sectional diagram similar to FIG. 10 showing a different means of incorporating a tint element into the lens.

Figure 15:
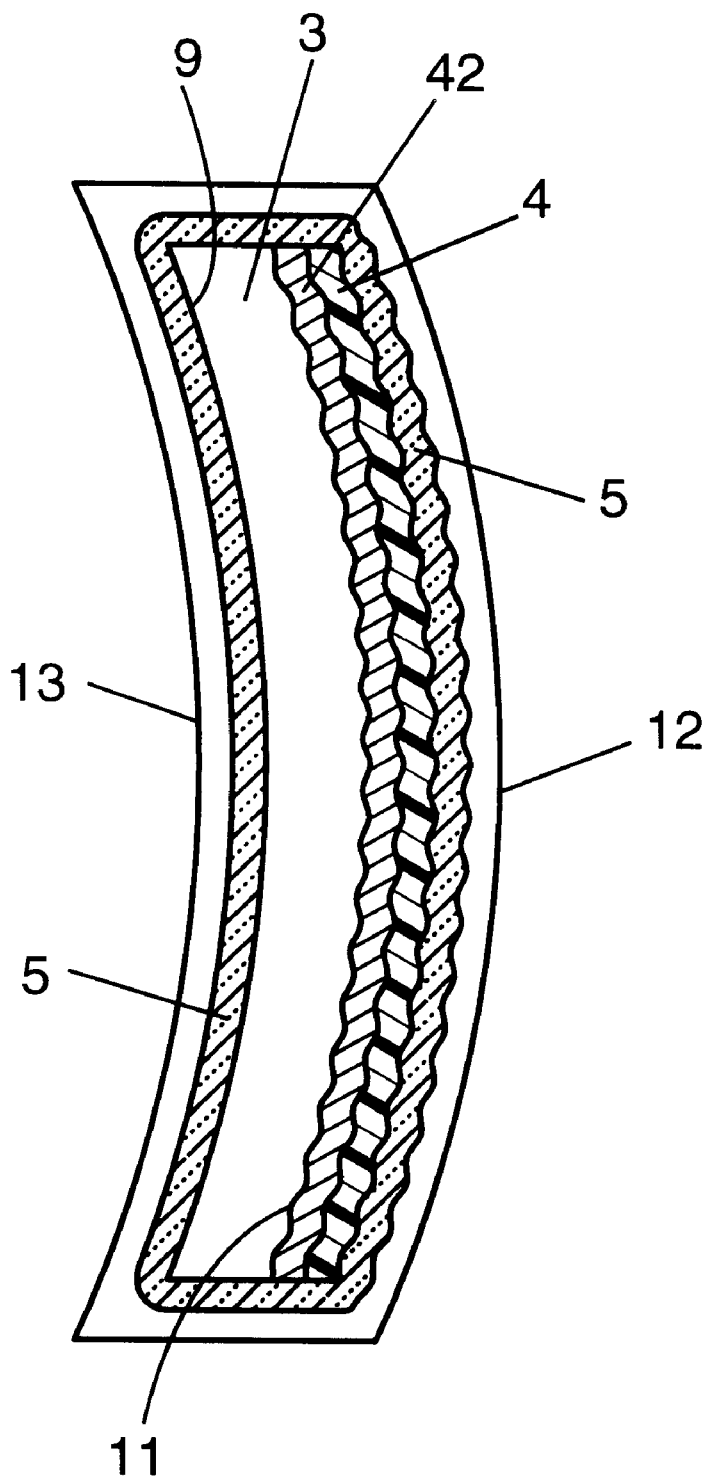

FIG. 15 is a cross-sectional diagram similar to FIG. 10 showing a different means of incorporating a tint element into the lens.

Figure 16:
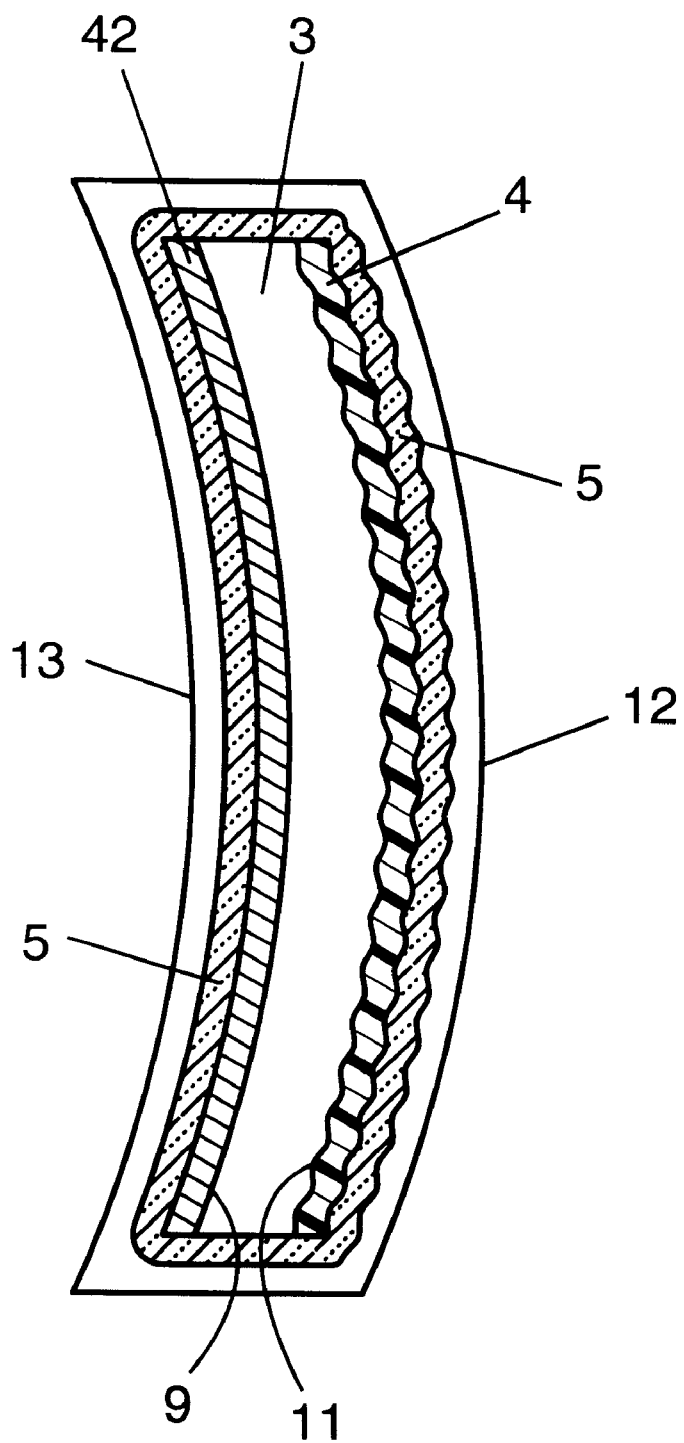

FIG. 16 is a cross-sectional diagram similar to FIG. 10 showing another means of incorporating a tint element into the lens.

Figure 17:
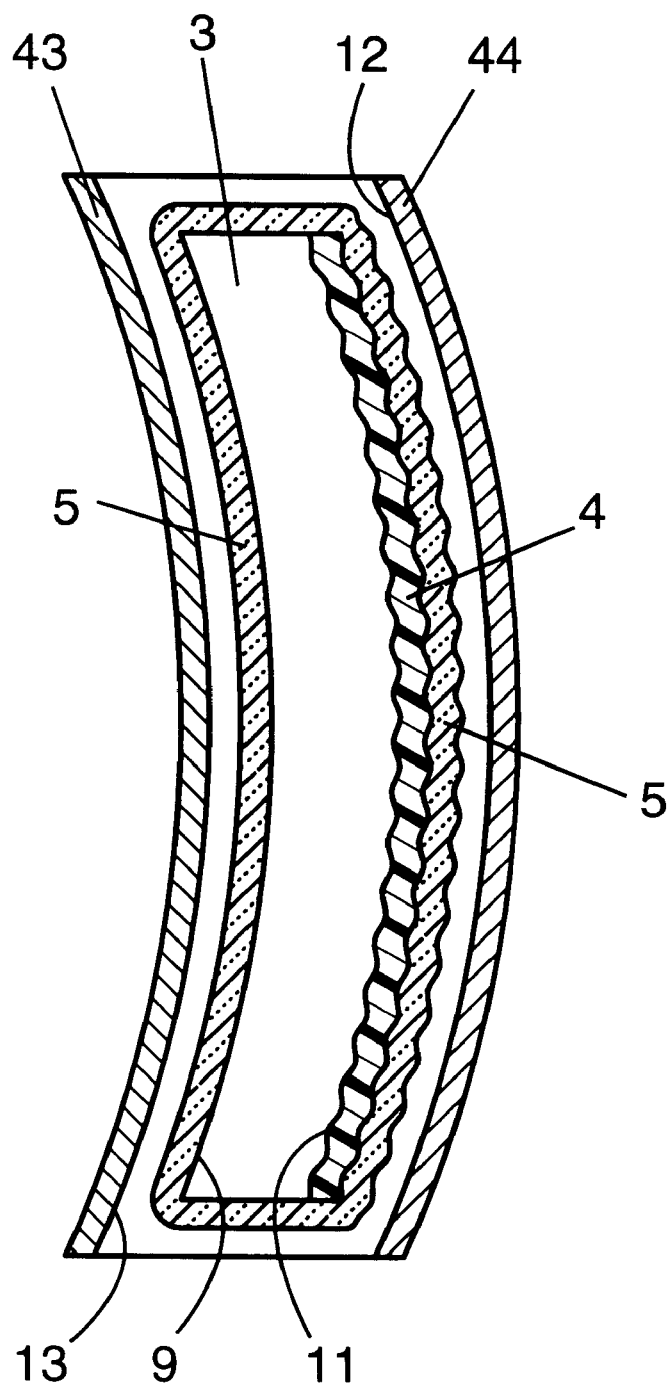

FIG. 17 is a cross-sectional diagram similar to FIG. 10 showing yet another means of incorporating a tint element into the lens.

Figure 18:
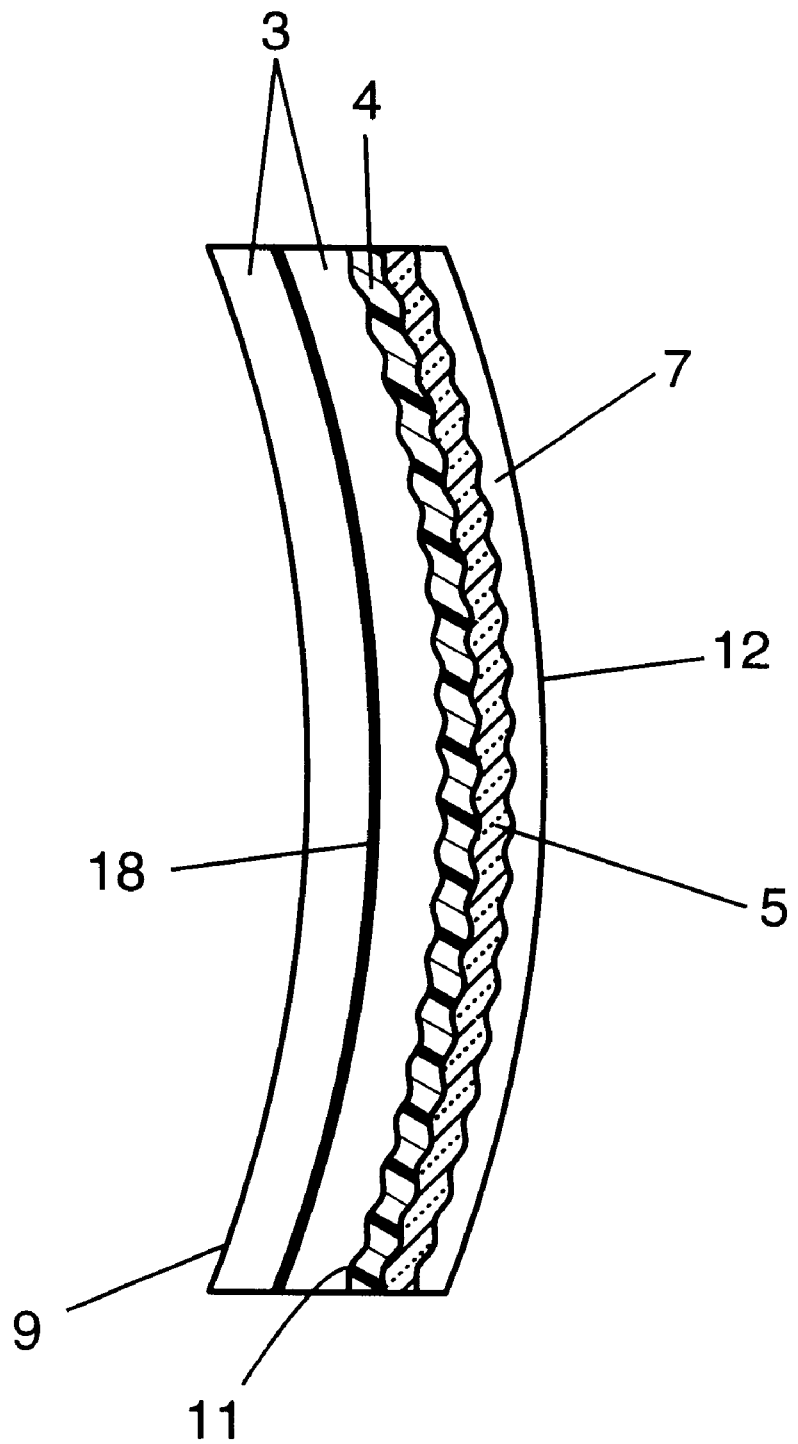

FIG. 18 is a cross-sectional diagram similar to FIG. 10 illustrating a different manner in which the lens may be created.

Figure 1A:
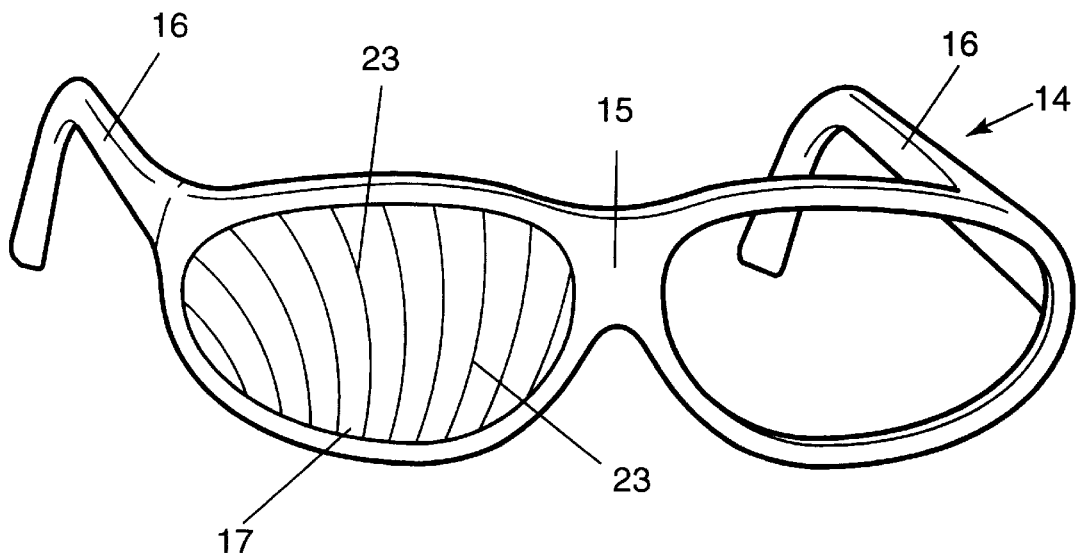
FIG. 1A is a pictorial diagram of a pair of sunglasses illustrating a lens having a brushed finish in accordance with the present invention.
Figure 1B:
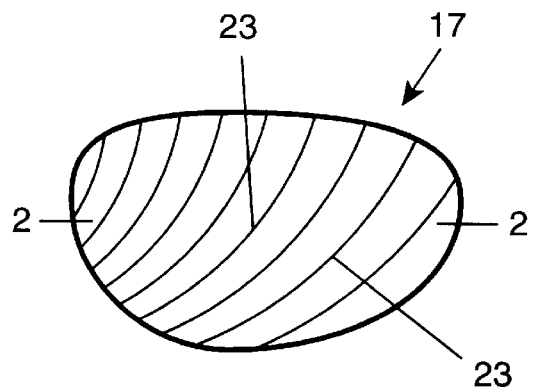
FIG. 1B is a pictorial diagram of a lens removed from the sunglasses of FIG. 1A.
Figure 19:
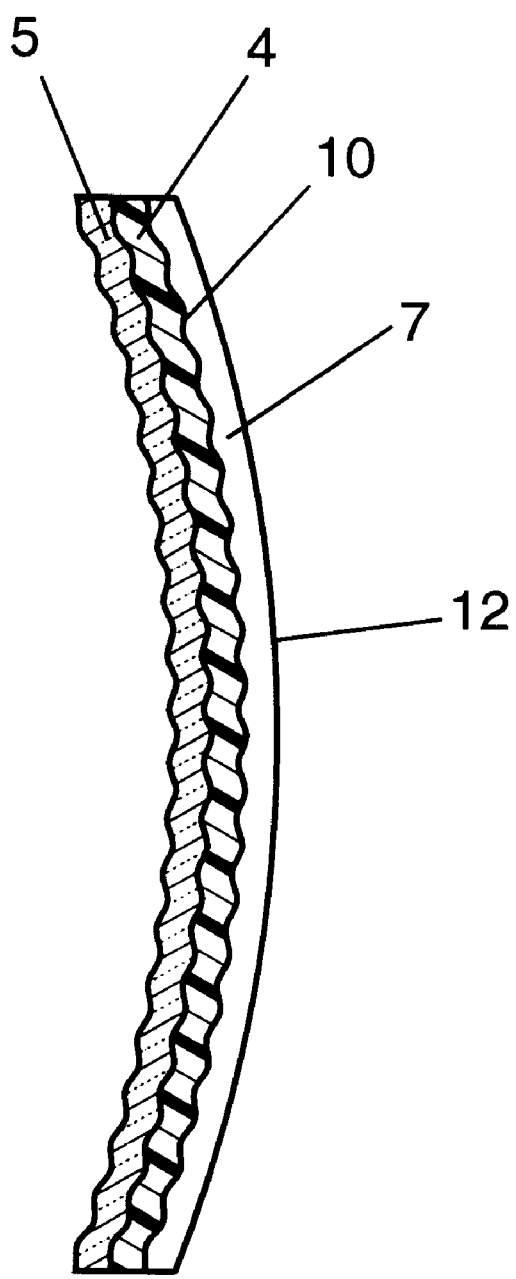

FIG. 19 is a cross-sectional diagram of a partially assembled lens taken along the line 2—2 of the lens of FIG. 1B. This diagram illustrates a different manner in which the lens may be created and is the first in a second series of illustrations showing the order in which the lens may be assembled.

Figure 20:
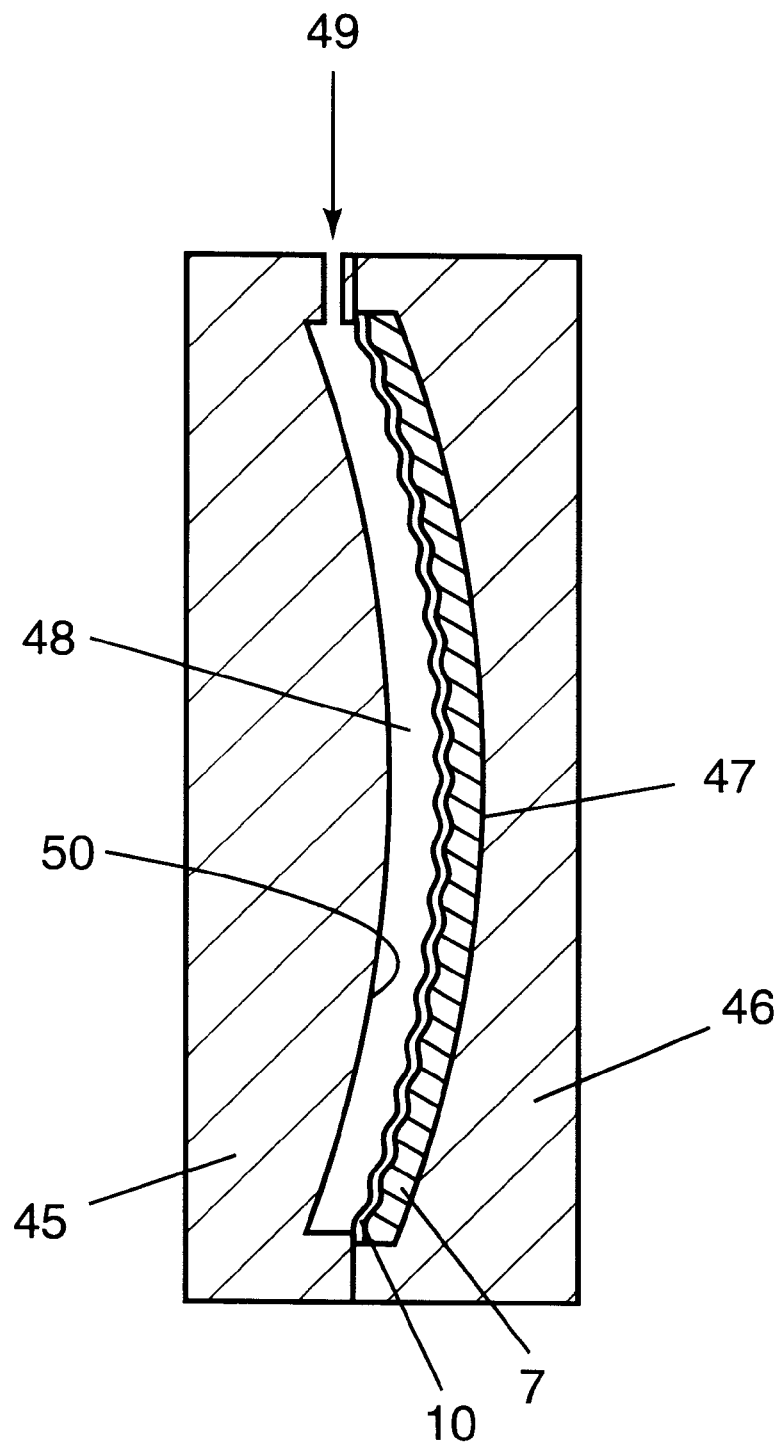

FIG. 20 is a cross-sectional diagram of a mold assembly employed to fabricate the lens of FIG. 19. This figure is similar to FIG. 9 in that a cross-section of a lens inside a mold is shown. However, this diagram illustrates a different manner in which the lens may be created and is the second in a second series of illustrations showing the order in which the lens may be assembled.

Figure 21:
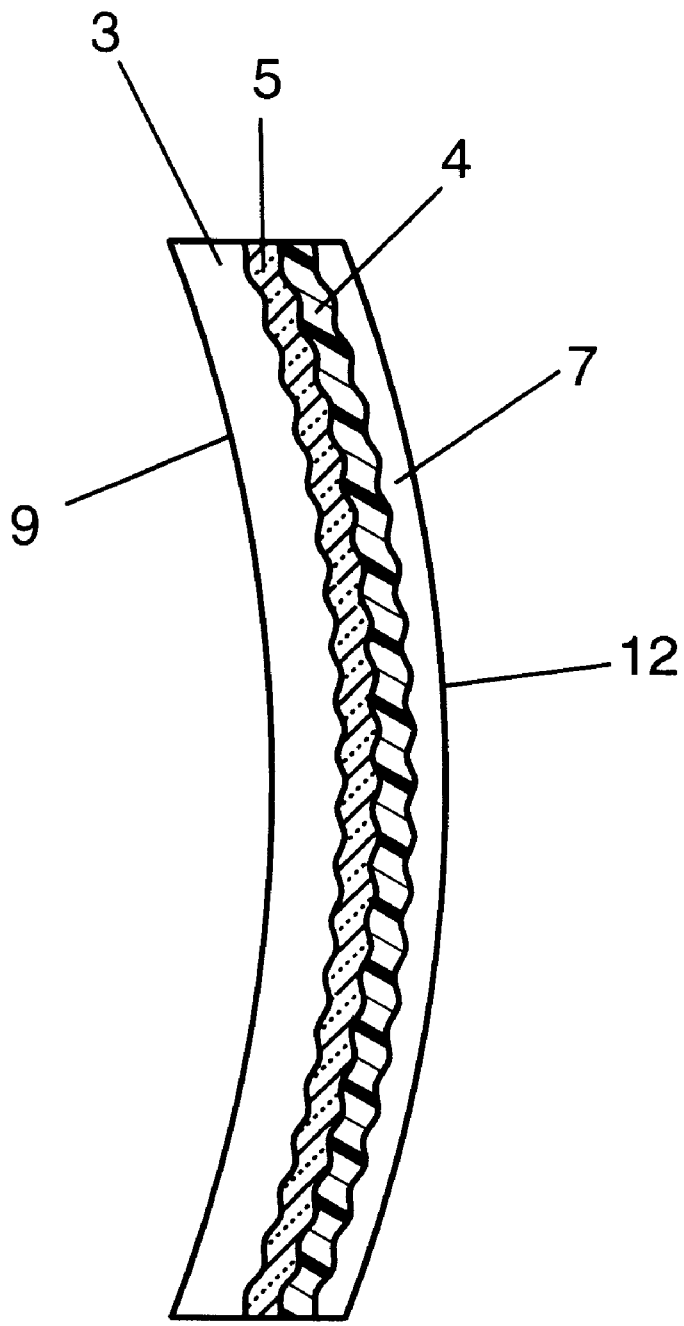

FIG. 21 is a cross-sectional diagram of the lens of FIG. 20 after being removed from the mold assembly of FIG. 20. This figure is similar to FIG. 10 in that a cross-section of a lens after having been removed from a mold is shown. However, this diagram illustrates a different manner in which the lens may be created. This diagram illustrates an additional lens element applied to the lens as result of having been placed inside a mold and is the third in a second series of illustrations showing the order in which the lens may be assembled.

DESCRIPTION OF THE PREFERRED EMBODIMENT

Referring now to FIGS. 1A–B, there is shown a pair of sunglasses 14 having a frame 15, temples 16, and lenses 17. As illustrated in FIG. 2, lenses 17 are structured to include an insert lens element 3, a polarized film 18, a relief pattern interface 11, a reflective medium 4, primer elements 5, 6, lens elements 7, 8, scratch resistant coatings 19, 20, and anti-reflective coatings 21, 22. Relative to the foregoing Summary of the Invention, insert lens element 3 represents the first lens element, and lens elements 7, 8 represent the second lens element. Lines 23 on the outer surface of lenses 17 of FIGS. 1A–B illustrate a brushed metal appearance created by the relief pattern interface 11 of FIG. 2.

Insert lens element 3 of FIG. 2 is fabricated of a thermset plastic material such as allyl diglycol carbonate commonly known as CR-39, a trademark of PPG Industries. Insert lens element 3 is fabricated as a polarized lens including polarized film 18. Surface 11 of insert lens element 3 is illustrated as being uneven, corresponding to the peaks and valleys of the relief pattern created by the brush finish along section line 2—2 of FIG. 1. Surface 9 of insert lens element 3 may be textured or it may be optically smooth. Reflective medium 4, which may comprise chromium, for example, is applied to the relief pattern 11 of insert lens element 3. Reflective medium 4 is only a few angstroms thick and, for all practical purposes, is of an even thickness across relief pattern 11. Primer elements 5, 6 provides a surface to which lens elements 7, 8 adhere. Lens elements 7, 8 are fabricated of the same plastic material as insert lens element 3.

Scratch resistant coatings 19, 20 are very thin non-structural coatings applied to surfaces 12, 13 and are of the conventional type commonly applied to plastic lenses. Anti-reflective coatings 21, 22 are also very thin non-structural coatings applied, by conventional vacuum deposition methods, over scratch resistant coatings 19, 20. Anti-reflective coatings 21, 22 comprise the outermost layers of the structure of lens 17 and are employed to improve transmission of light throught the lens 17 as well as to enhance the aesthetic appearance thereof. Alternatively, the anti-reflective coatings 21, 22 may be applied, in place of the scratch resistant coatings 19, 20, directly over surfaces 12, 13, in which case the anti-reflective coatings 21, 22 would remain the outermost layers of lens 17.

Primer elements 5, 6 each comprise a non-tacky film that is only a few angstroms thick and has, for all practical purposes, an even thickness along all points of the reflective medium 4 and the opposite side 9 of the insert lens element 3. Primer elements 5, 6 function as adhesion promoting elements and are believed to be an important feature of the present invention. The purpose of primer elements 5, 6 is to allow an optical grade hardenable plastic material, which does not have the necessary adhesion characteristics of its own, to adhere to reflective medium 4, while at the same time not adhering to the mold in which the plastic material is being cast. The use of primer elements 5, 6 is very important because they allow a hardenable plastic layer 7 to be made of the same material as is used to fabricate lens elements 3, 7. Furthermore, primer elements 5, 6 allow the lens element 7 to correspond very closely, if not perfectly, to the peaks and valleys of relief pattern 11, while at the same time forming optically smooth outer surface 12.

Like reflective medium 4, the refractive index of primer elements 5, 6 is not required to be the same as that of the other light transmitting materials employed in fabricating lens 17. This is because primer elements 5, 6 are very thin, on the order of angstroms, and they are, for all practical purposes, of uniform thickness. Referring again to FIG. 2, the combined thickness of reflective medium 4 and primer element 5 is on the order of angstroms. Furthermore, the thickness of those elements along the uneven surface of relief patter 11 is substantially uniform. The significance of this is that the peaks and valleys along all of the points along the interior surface of lens element 7 substantially match the peaks and valleys along all points of relief pattern 11 of insert lens element 3, and all points along interface 10 and relief pattern 11 are so close to one another that lens elements 3, 7 are almost touching each other.

As stated above, lens element 7 and insert lens element 3 are fabricated of the same light transmitting material and, therefore, have the same refractive index. This characteristic is significant in that light, which is distorted when passing through interface 10, will be redirected, to the same degree that the light was distorted, back to its original path when the light passes through relief pattern interface 11. If the refractive index of the light transmitting material used to fabricate lens element 7, in the case in which the lens element 7 is defined by the interface 10 and the optically smooth surface 12, is not the same as the refractive index of the material used to create lens element 3 and its corresponding relief pattern interface 11, the distortion of the tranmitted light would not be fully corrected when passing through the relief pattern interface 11. That is why lens elements 3 and 7 should be fabricated of the same material. In addition, lens element 8 is preferably also fabricated of the same material from which lens elements 3 and 7 are fabricated.

With further reference to FIG. 2, surfaces 12, 13 are optically smooth and substantially parallel to one another. As illustrated, surfaces 12, 13 are curved to be convex and concave, respectively, the same as a conventional spherical lens. Also like a conventional sperical lens, the sperical diameters of the convex and concave surfaces may be modified to create either no magnification or any desired degreee of magnification. Alternatively, lens 17 may be fabricated to be flat, in which case surfaces 12, 13 would also be flat.

As stated above, anti-reflective coatings 21, 22 are applied to surfaces 12, 13 by conventional vacuum deposition methods. They serve to improve the transmission of light through the lens 17 by reducing the amount of light that is re-reflected, primarily by reflective medium 4 within lens 17. In one embodiment of the present invention, the anti-reflective coatings 21, 22 serve to enhance the aesthetic effect of lens 17 by significantly reducing the amount of light reflected off of the outer surface 12 of lens 17. Given that surface 12 is optically smooth, it will inherently reflect light in the form of an image, the same as a window pane. When the anti-reflective coatings 21, 22 are incorporated in lens 17, the vast majority of light being reflected by the lens 17 comes from the reflective coated relief pattern encapsulated therein. If, for instance, the relief pattern interface 11 is in the form of a brushed or sand blasted finish, the lens 17 takes on a very unique appearance in that they can be made to look like dull textured steel.

Figure 3:
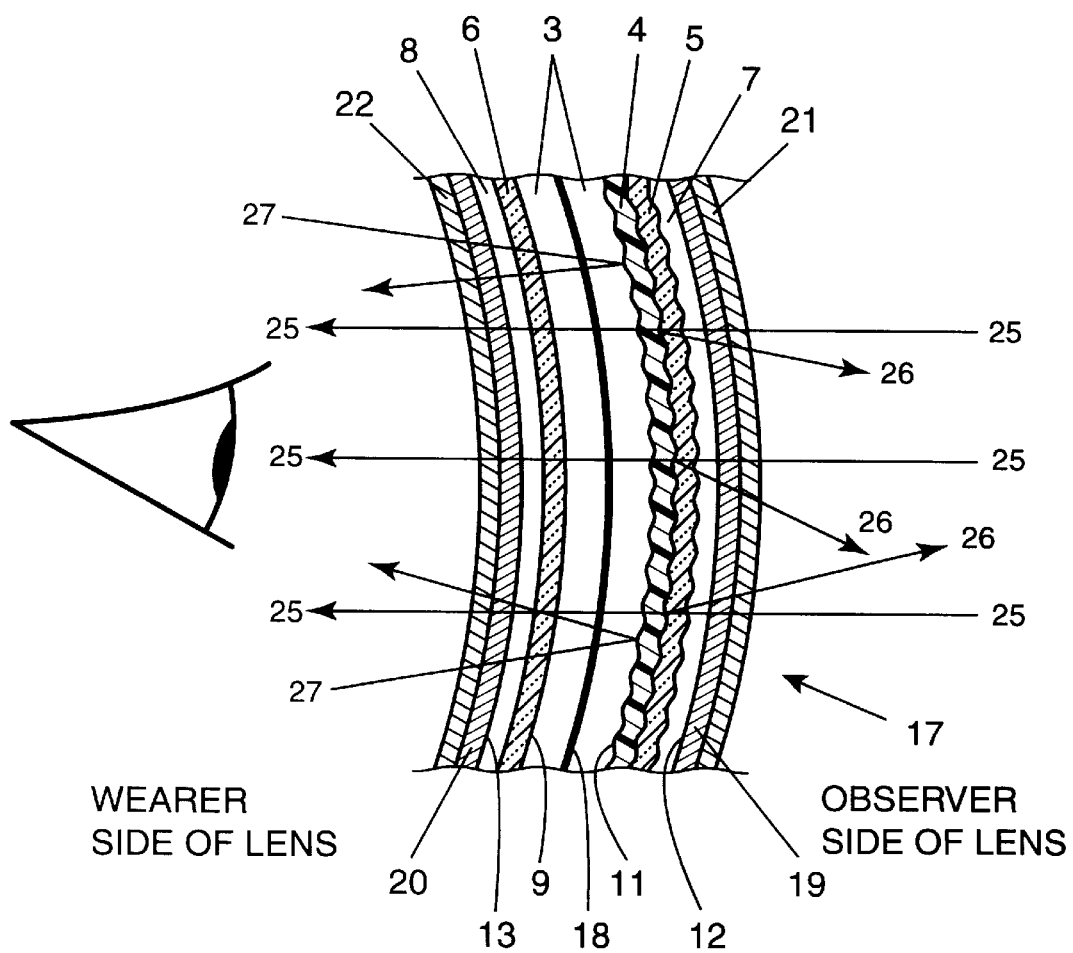
FIG. 3 is a cross-sectional diagram taken along the line 2—2 of the lens of FIG. 1B, illustrating the effects of light rays as they pass through the lens.

Referring now to FIG. 3, it may be seen how light rays 25 are transmitted through lens 17. Light rays 25 pass through lens 17 to the eyes of the wearer. To a great extent, light rays 25 remain parallel to one another as they pass through the entirety of the lens 17. Upon striking the reflective coated relief pattern 4, a portion of the light rays 25 are reflected, by the reflective medium 4, in a scattered manner. The scattering of the reflected light highlights the topography of the reflective coated relief pattern 11 of the insert lens element 3. A portion of the light rays 25 pass through the reflective medium 4. The polarized film 18 absorbs a large portion of the light rays 25 as they pass through the polarized film 18. The polarized film 18 acts as a light absorbing medium to provide a meaningful amount of light absorption. Light rays 27 are illustrating entering the lens 17 from behind. As light rays 27 pass through the polarized film 18, a large portion of the light is absorbed by the polarized film 18. Some of the remaining light rays 27 are reflected back by the reflective medium 4, whereupon they once again pass through the polarized film 18. Some of the remaining light rays 27 are again absorbed by the polarized film 18. A light absorbing medium, such as a polarized film, is an important element of lens 17 in that it significantly reduces the amount of scattered light that would otherwise reach the eye of the wearer. It should be noted that all of the elements of lens 17 inherently absorb some amount of light. The amount of light that is absorbed by a given lens element will vary depending on the particular composition of the element. For example, the reflective medium 4 that is employed will absorb more or less light depending on the material of the reflective medium 4 and the thickness thereof.

Figure 4:
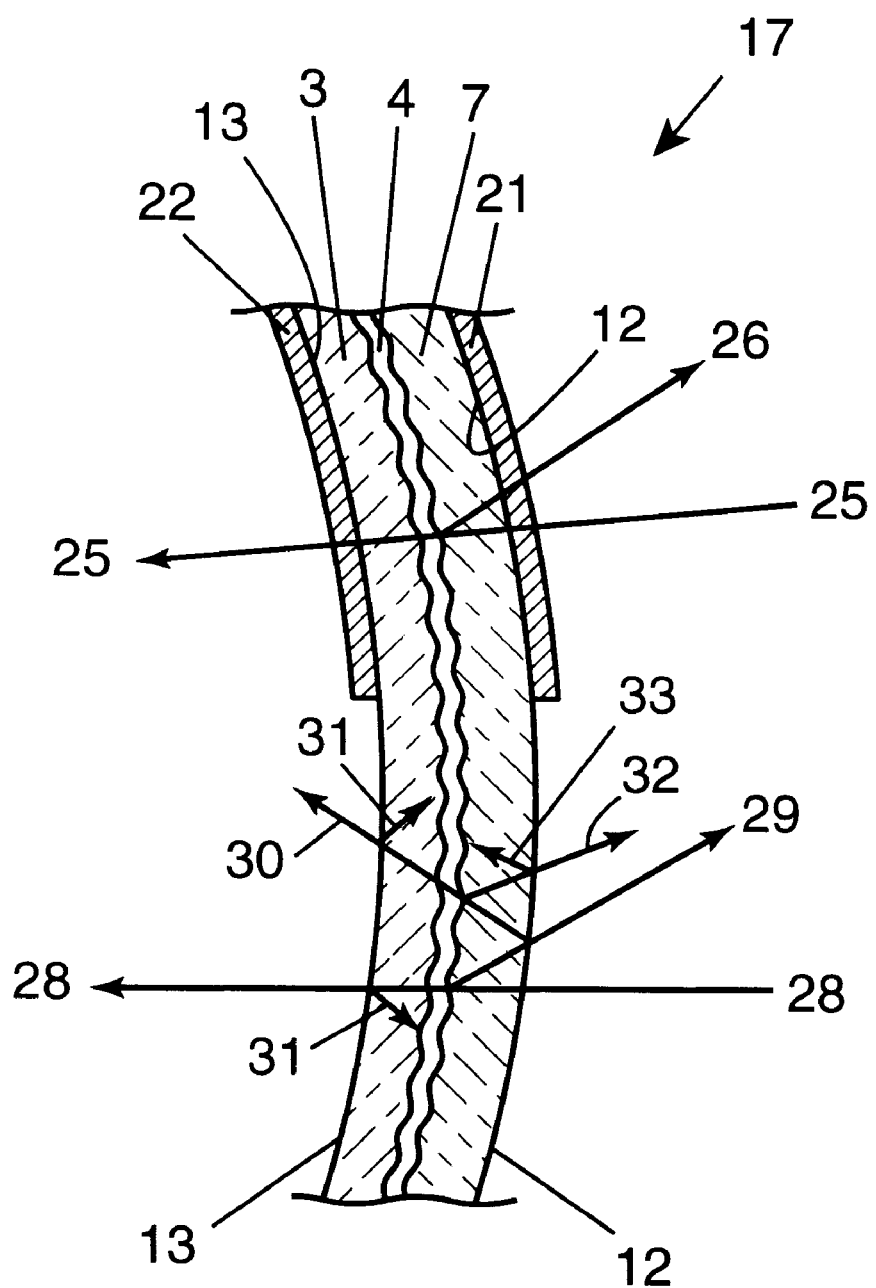
FIG. 4 is a partial cross-sectional diagram taken along the line 2—2 of the lens of FIG. 1B, illustrating the effects of light rays as they pass through the lens.

Referring now to the simplified illustration of FIG. 4, there are shown optically smooth outer surfaces 12, 13 having a relief pattern highlighted by a reflective medium 4 encapsulated therebetween. This diagram illustrates how light rays interact with the lens 17 and how the anti-reflective coatings 21, 22 of FIGS. 2 and 3 function. The upper portion of the lens 17 of FIG. 4 includes anti-reflective coatings 21, 22 applied to surfaces 12, 13. The lower portion is without anti-reflective coatings 21, 22. A light ray 28 passes through the lens 17, while a light ray 29 represents a portion of light ray 28 that is reflected by reflective medium 4. Light ray 30 represents a portion of light ray 29 that is reflected by the inner surface 12. Light ray 30 is an incongruent light ray that will reach the eye of the wearer and cause a distraction such as haze or glare. A light ray 33 represent a portion of the reflected light ray 32 that is reflected by the inner surface 12. As in the previous example, light ray 33 will cause a distraction to the wearer. As light rays 28, 30 reach the inner surface 13 of lens 17, portions of those light rays will again be reflected back toward the reflective medium 4, represented by light rays 31. Light rays 31 will reflect off the reflective medium 4, thus causing a distraction to the wearer.

Light ray 25 is shown passing through the lens 17. Light ray 26 is shown as a portion of the light ray 25 that is reflected by the reflective medium 4. Light ray 26 is able to pass through interface surface 12 and adjacent anti-reflective coating 22 without being reflected back toward the reflective medium 4. Anti-reflective coatings do not eliminate all surface reflections, but they do eliminate a meaningful portion of them. Because there is a reflective coated relief pattern encapsulated within lens 17, the lens 17 creates a level of internal reflections not normally encountered in conventional lenses. One result of employing anti-reflective coatings 21, 22 in lens 17, as illustrated in FIG. 2, is that the optical acuity of lens 17 is considerably enhanced.

Two methods are described hereinafter for fabricating a lens in accordance with the present invention. They are referred to as the insert lens method and base lens method. The insert lens method involves encapsulating a preformed first lens element inside a second lens element, in which both of these lens elements are made of the same thermoset plastic material. The encapsulation process involves casting a second lens element around the first lens element.

Figure 5:
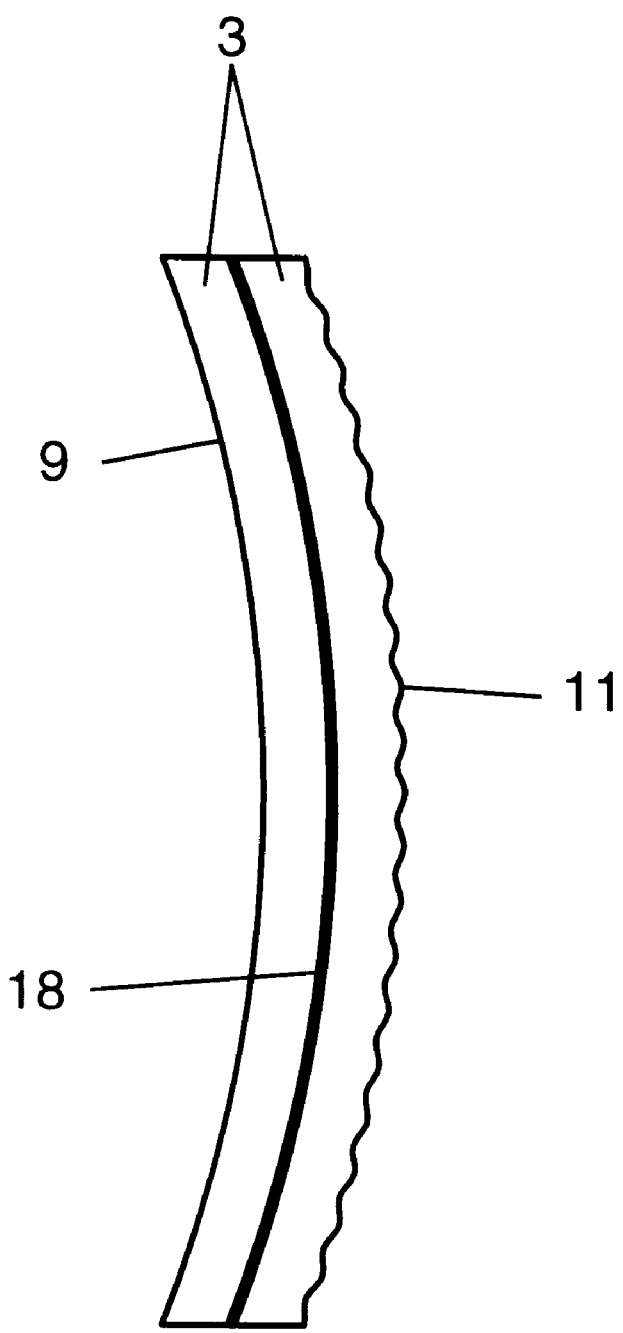
FIG. 5 is a cross-sectional diagram similar to FIG. 2 showing one of the elements of the lens of FIG. 1B. This diagram is the first in a first series of illustrations showing the order in which the lens may be assembled.

Referring now to FIG. 5, there is shown the insert lens element 3 of lens 17 of FIG. 2. Insert lens element 3 is preferably fabricated of a thermoset plastic material such as allyl diglycol carbonate commony known in the industry as CR-39, which is a trademark of PPG. Insert lens element 3 is cast using techniques commonly known in the industry, employing a first mold, a second mold, and a gasket. The first and second molds are inserted into the gasket in a manner which creates a mold cavity defined by the molding surfaces of the first and second molds, the gasket being employed to hold the molds together. The combination of the first and second molds inserted into the gasket form a mold assembly. The mold assembly is then filled with a raw or uncured thermoset plastic material. The thermoset plastic material is then cured using a conventional heat process, following which the cured thermoset plastic material is removed from the mold assembly in the form of insert lens element 3. The first mold includes a concave molding surface, while the second mold has a convex molding surface. Thus, it is possible to fabricate insert lens element 3 to be spherical, as are most conventional lenses. The second mold creates the concave surface 9 of the insert lens element 3, while the first mold creates the convex surface 11 thereof. The difference in the way the insert lens element 3 of the present invention is cast compared to the way in which a conventional lens is cast is that the molding surface of one of the two molds employed to cast insert lens element 3 has a relief pattern thereon depicting a texture, image or logo to be replicated. When casting a conventional lens, the molding surfaces of both molds are optically smooth so that when casting of the lens is complete, the lens will have optically smooth surfaces. In the case of insert lens element 3 of FIG. 5, the first mold contains a relief pattern to be replicated on the concave molding surface thereof. The uneven surface 11 of FIG. 5 illustrates the relief pattern created by the first mold. The molding surface of the second mold, employed to create surface 9, may be textured or it may be optically smooth. Both glass molds and metal molds are commonly employed for this type of casting. Metal molds have been found to work well when providing a molding surface having a surface relief pattern to replicated by a hardenable plastic.

As previously described, lens 17 has a brushed metal appearance represented by lines 23 of FIG. 1, created by a metal mold. The well known electro plating process for making metal molds lends itself very well to the fabrication of metal molds having a brushed or sand blasted finish. Metal molds typically require the use of a stainless steel mandrel that serves as a master from which metal molds are fabricated. If the mold is to have a spherical concave molding surface, the mandrel must have a spherical convex surface. The convex surface of the mandrel is electro plated with a metal, such as nickel. Once the metal has reached a desired thickness, such as 1 millimeter or more, the metal is removed from the surface of the mandrel in the form of a concave mold, which is in the form of a negative of the mandrel. When fabricating conventional molds, the surface of the mandrel to be replicated is optically smooth, which in turn imparts an optically smooth molding surface. The difference between the manner of fabricating a conventional metal mold and one having a brushed or sand blasted finish is in the surface finish given the mandrel. That is, instead of the mandrel having an optically smooth surface, the surface is given a brushed or sand blasted finish. Because the mandrel is made of stainless steel, it is very easy to create a brushed or sand blasted finish thereon.

The mandrel used to create the first mold is typically machined from stainless steel on a computer-controlled lathe, and the brushed finish relief pattern is applied to the surface of the mandrel by sanding the convex surface with sand paper and an abrasive pad. The sand blasted finish of the mandrel is achieved by glass beading the convex surface of the mandrel. It should be noted that sand blasting and glass beading are very similar processes, the only difference being the media that is used to create the texturing. If desired, sand media can be used instead of glass bead media. However, the use of glass bead media is preferred. The term sand blasted is used simply because it better describes the aesthetic appearance. The molds created from the brushed mandrel and the glass beaded mandrel replicate the given textured surface of the mandrel. In turn, insert lens element 3, cast from these molds, replicates the textured surface relief pattern thereof. Relief pattern surface 11 of FIGS. 2–5 represents the uneven nature of the relief pattern created by a mold having a brushed finish. This surface can just as easily serve to describe almost any surface relief pattern. Though there are other ways of creating a surface relief pattern on a lens element, casting the desired relief pattern directly into the lens element appears to be the most efficient way.

Insert lens element 3 may be fabricated in any one of four ways, defined by the manner in which a light absorbing tint is incorporated into the lens 17. Insert lens element 3 may be cast as a polarized lens element using thermoset plastic techniques well known in the industry. Alternatively, insert lens element 3 may be cast with a tinted film 18 that is not polarized, as depicted in FIGS. 2, 3, and 5. As another alternative, insert lens element 3 may be cast using pre-colored plastic without a polarized film, as illustrated in FIG. 14. Finally, insert lens element 3 may be cast without a film, using uncolored plastic material, as depicted in FIGS. 15–17. Regardless of the casting method employed, insert lens element 3 is preferably cast to a thickness within the range of 1.6 to 2.2 millmeters.

Figure 6:
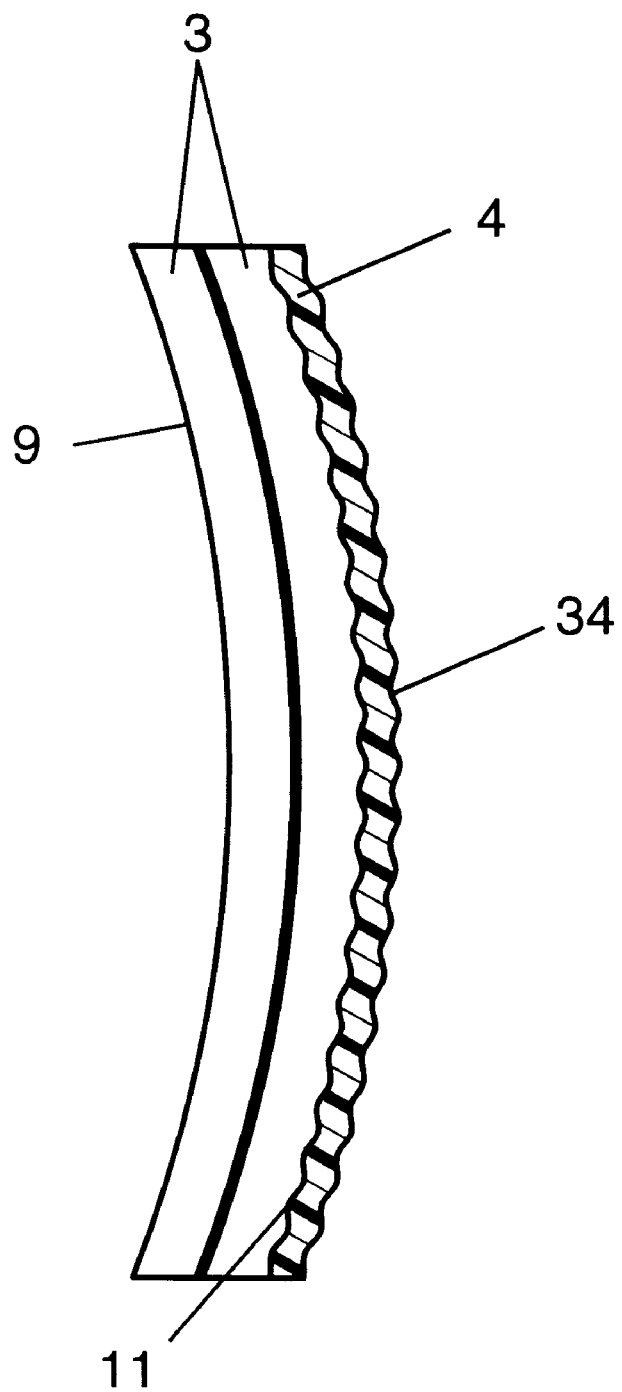
FIG. 6 is a cross-sectional diagram similar to FIG. 2 showing the application of a reflective medium. This diagram is the second in a first series of illustrations showing the order in which the lens may be assembled.

The next step in the process of fabricating lens 17 of FIG. 2 involves the application of the reflective medium 4 of FIG. 6 to the surface of the brushed finish relief pattern 11 of the insert lens element 3. Reflective medium 4 may comprise any of a number of different materials. The reflective medium may be chosen to reflect light of a specific color, such as blue, gold or silver. In turn, the completed lens 17 may be made to reflect light of a specific color by simply choosing the appropriate reflective medium 4. If the relief pattern of the insert lens element 3 is in the form of a brushed metal finish and silver reflective medium 4, such as chromium, is applied to the relief pattern, the appearance of the reflective coated relief pattern will that of brushed metal. In fact, the appearance of the reflective coated relief pattern will be very similar to the brushed finish stainless steel mandrel used to create the first mold. If, on the other hand, a blue or gold reflective medium, such as a dielectric type coating, is applied to the brushed finish relief pattern, the reflective coated relief pattern will look like brushed aluminum that is anodized blue or gold, respectively. If, for example, the relief pattern of the insert lens element 3 is in the form of a sand blasted finish and a silver reflective medium 4, such as chromium, is applied to the relief pattern, the appearance of the reflective coated relief pattern will be that of sand blasted metal. If colored reflective mediums are applied to the sand blasted relief pattern, the result is more of a matte finish of the given color.

Figure 7:
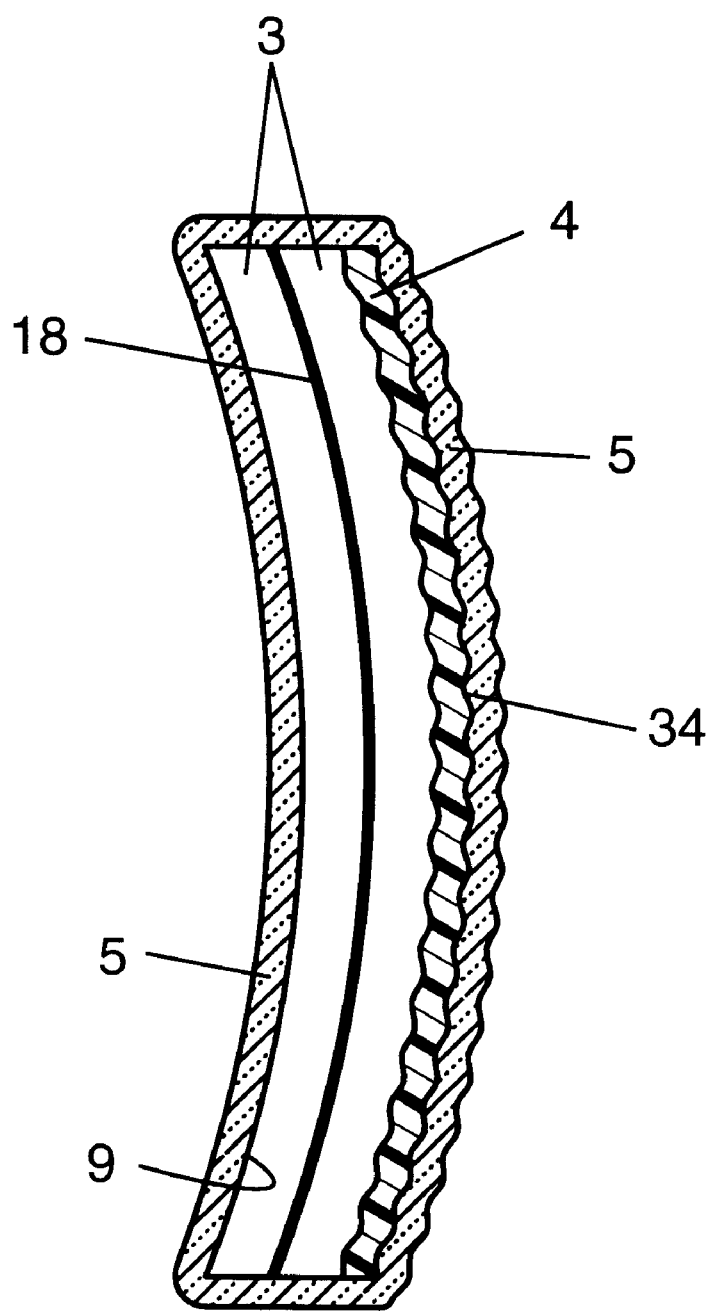
FIG. 7 is a cross-sectional diagram similar to FIG. 2 showing the application of a adhesion promoting element. This diagram is the third in a first series of illustrations showing the order in which the lens may be assembled.

The next step in the process of fabricating lens 17 of FIG. 2 is to coat insert lens element 3 of FIG. 7 and surface 34 of reflective medium 4 of FIG. 7 with an adhesion promoting primer, employing any of a number of known coating methods, such as spraying, spin coating or dip coating. The adhesion promoting primer coating is applied in a manner so as to allow the coating to flow freely across the lens and then evaporate. The reflective coated and primer coated insert lens element 3 is referred to as a prepared insert lens element.

The primer employed in this step is preferably any one of number of commercially available liquid silanes. Not all silanes promote adhesion. Some silanes are, in fact, designed to inhibit adhesion. A silane found to work well as an adhesion promoting primer in the present invention is known as Z6032 manufactured by Dow Corning. That silane, in the concentrated form in which it is supplied by the manufacturer, is prepared before it is applied to the surface of the reflective medium 4. More specifically, the silane is diluted in methanol at approximately 1 part silane concentrate to 100 parts methanol and then mixed together to form a primer. The methanol serves as a carrier for the silane. After the primer is applied to the surfaces of the insert lens element 3, the methanol carrier is allowed to evaporate from the primer mixture, leaving behind a transparent dry solid state micron thin film, which provides a surface to which the second lens element adheres.

Figure 8:
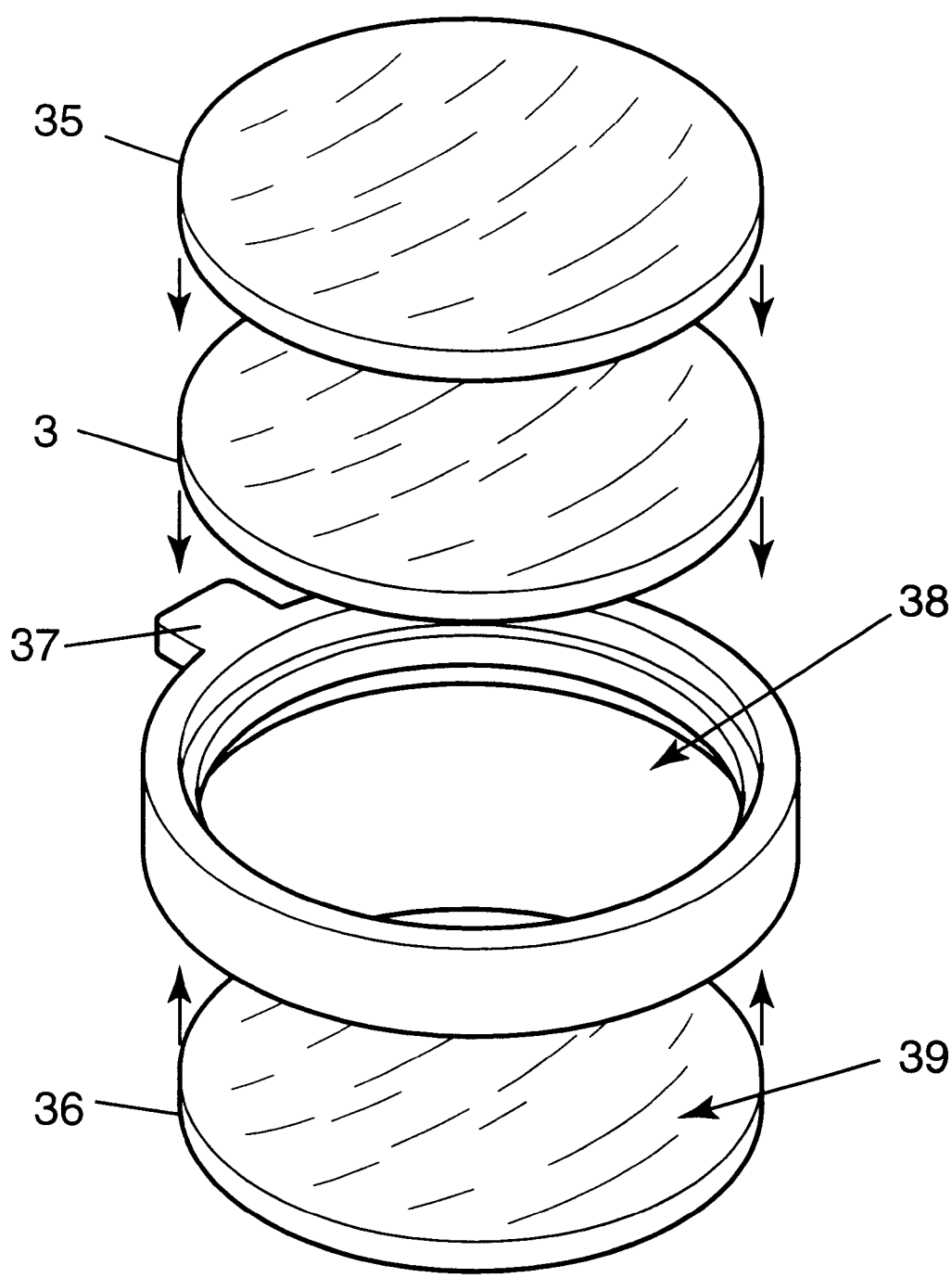
FIG. 8 is an exploded diagram showing the lens of FIG. 7 positioned inside a mold assembly. This diagram is the fourth in a first series of illustrations showing the order in which the lens may be assembled.

The next step in the process of fabricating lens 17 of FIG. 2 is to encapsulate the prepared insert lens element 3, as depicted in FIG. 7, in a plastic material. Referring now to FIG. 8, there is shown a molding assembly employed for this purpose, including a first mold 36, a second mold 35, and a gasket 37. First and second molds 36, 35 may be made of either glass or metal and are of the type, along with gasket 37, commonly employed in the optical industry for casting lenses. First mold 36 has an optically smooth concave molding surface 39, and second mold 35 has an optically smooth convex molding surface. First mold 36 is illustrated as being inserted into the round molding gasket 37. After first mold 36 is placed in gasket 37, an uncured and, preferably uncolored, thermoset plastic material is poured into the open mold at a point 38. The uncured plastic flows out against the concave molding surface 39 of the first mold 36. The convex side of the prepared insert lens element 3 of FIG. 7, having the primer coated and reflective coated relief pattern thereon, is set against the concave molding surface of first mold 36. The uncured plastic flows out between the primer coated and reflective coated relief pattern of the prepared insert lens element 3, and the optically smooth concave molding surface of first mold 36 so as to completely engulf the prepared insert lens element 3. The mold assembly is then closed by placing second mold 35 into gasket 37, opposite first mold 36. The optically smooth convex molding surface of second mold 35 is thus positioned adjacent the concave surface 9 of prepared insert lens element 3. Any excess uncured plastic is forced out of the closed mold as the second mold 35 is placed into the gasket 37. In the process, air bubbles are forced out of the molding assembly. The foregoing step may also be further understood with reference to the cross-sectional diagram of FIG. 9.

Next, the closed molding assembly is placed inside an oven in a horizontal position along line 40 of FIG. 9. With the closed molding assembly in that position, the prepared insert lens element 3 will settle down against the concave molding surface of first mold 36. The spherical diameter of surface 11 of FIG. 7 of the insert lens element 3 is made to be slightly larger than the spherical diameter of the concave molding surface of first mold 36. Fabricating the insert lens element 3 in this manner is important because by doing so the center area of surface 11 will not come in contact with the concave molding surface of first mold 36. As insert lens element 3 settles down, only the periphery of the prepared insert lens element 3 will come in contact with the molding surface, which causes no problems at all. If the center area of surface 11 of prepared insert lens element 3 comes in contact with the concave molding surface, a blemish in the finished lens 17 may result at the point of contact, in turn rendering the lens 17 defective and unusable. In a similar manner, the concave spherical diameter 9 of insert lens element 3, as illustrated in FIG. 7, is made to correspond to the convex molding surface of second mold 35.

The heat of the oven employed in the curing process described above causes uncured plastic material to harden and become adhered to all primer coated surfaces. After the uncured plastic is cured, the newly formed basic lens is removed from the molding assembly. With reference to FIG. 7, it should be mentioned that it is not necessary that the primer element be applied to surface 9 of insert lens element 3. Allyl diglycol carbonate has the ability to adhere to itself without adding an additional adhesion promoting element. However, the primer does provide a better bond between the plastic lens elements. The main purpose of the primer is to enable the thermoset plastic material to adhere to the reflective medium 4.

The result of the foregoing casting process is that the peaks and valleys of the reflective coated and primer coated relief pattern are filled in by lens element 7 of FIG. 10, and the prepared insert lens element 3 is given new outer surfaces 12, 13 that are optically smooth. The plastic material used to cast around the prepared insert lens element 3 is the same type of material used to create the insert lens element 3 of FIG. 5. Lens element 7 represents the second lens element, as previously described. It should also be noted that lens element 8 of FIGS. 2 and 3 is represented in FIG. 10 as lens element 7. The insert lens method of construction may be employed to fabricate a thin lens by positioning the first and second molds 36, 35 to within approximately one to two tenths of a millimeter, or less, of the surfaces of the prepared insert lens element 3. The thickness of the second lens element 7 of FIG. 10, defined by the primer coated and reflective coated relief pattern and the surface 12, is approximately one to two tenths of a millimeter. The only restriction to the thickness of lens element 7 of FIG. 10 is that it must be thick enough to fill in the relief pattern and provide an optically smooth surface. The thickness of the second lens element 7 of FIG. 10, or the second lens element 8 of FIG. 2, defined by the primer coated surface 9 of FIG. 10 and the surface 13, is dependent on the size of the gasket 37 employed in the preceding molding step. Molding gaskets are available in many different sizes. By simply choosing a thicker or a thinner gasket, the final lens may be made thicker or thinner. Gasket 37 of FIG. 8 is of a size that creates a lens edge thickness of 2.2 millimeters. Depending on the size of the gasket 37 eimployed and the thickness of the insert lens element 3, a completed lens may have a final edge thickness in the range of 1.6 to 2.2 millimeters. Insert lens element 3 of FIG. 5 is approximately 2 millimeters in thickness.

As described, the lens 17 may also be made extra thick. A conventional lens, referred to as a semi-finished lens, is commonly used in the optical industry for the purpose of creating prescription eyewear. The term semi-finished is given to a lens that is made extra thick. Prescription lenses are created from semi-finished lenses by grinding and polishing the extra thick lens down to a thinner lens of specific magnification. Typically, it is the concave or backside surface of the semi-finished lens that is ground and polished. Extra thick semi-finished lenses have been in use for many years and are well known in the industry. Using the insert lens method, the basic lens may be fabricated as a semi-finished lens by simply changing the size of gasket 37 employed in the above method step. The effect of a thicker size gasket 37 in the arrangement of FIG. 9 is that the thicker gasket positions the molding surfaces of the first and second molds 36, 35 further apart. The present lens 17, fabricated as a semi-finished lens, may be processed in the same way as any conventional polarized or non-polarized plastic semi-finished lens.

If desired, the present method of insert casting may be accomplished without employing gasket 37. Referring to FIG. 9, first mold 36 is positioned as illustrated. Uncured plastic material is poured onto the concave surface 39 of first mold 36. The convex side of the prepared insert lens element 3 of FIG. 7, having a primer coated and reflective coated relief pattern thereon, is set against the optically smooth concave molding surface of the first mold 36. The uncured plastic flows out between the primer coated and reflective coated relief pattern of the prepared insert lens element and the optically smooth concave molding surface of the first mold 36. Uncured plastic is then poured onto the prepared concave surface 9 of the insert lens element 3 of FIG. 7. The optically smooth convex surface of the second mold 35 is then placed against the prepared concave surface of the prepared insert lens element 3. The uncured plastic flows out between the concave surface of the prepared insert lens element 3 and the optically smooth molding surface of the second mold 35. The uncured plastic material is then cured by a heat process. After curing, the newly formed basic lens is removed from the first and second molds 36, 35. This method is only advantageous when casting a thin lens because the back mold is resting against the concave periphery of the insert lens element 3. If the back mold is allowed to come in contact with the concave side of the insert lens element, as described by this method, it is important that the spherical diameter of the concave surface of the insert lens element is at least slightly smaller than the spherical convex diameter of the molding surface of the second mold 35. This is to prevent the center area of the back mold from coming in contact with the center area of the concave surface of the prepared insert lens element.

Whether using a gasket 37 or not during the insert lens method of casting lens 17 as a thin lens, the main objective is to cast the lens 17 with no magnification. Thin lenses not of a prescription or corrective type and having no magnification are commonly referred to as plano lenses. The main objective of casting lens 17 as a plano lens is so that it can be mass produced as such and used in eyeglass or sunglass frames. It should, however, be noted that lens 17 may just as easily be cast as a thin lens having a specified magnification in order to produce a corrective type lens. All that is required to cast lens 17 as a thin lens of the corrective type is to select a gasket 37 of the appropriate size and to use molds that have molding surfaces of the appropriate spherical diameter. Molds used to cast prescription lenses are well known in the industry.

Referring now to FIG. 10, there is shown a completed basic lens fabricated by employing the foregoing insert lens method. The basic lens may be processed the same as any conventional polarized or non-polarized plastic lens. The processing includes, but is not limited to, grinding and polishing to a specified prescription, edging or cutting down to fit almost any given frame shape, adding additional thin film coatings such as the previously described anti-reflective coatings or scratch resistant coatings, and tinting to a desired color or light absorbing density. If processing is to include grinding and polishing, the basic lens should be made as a semi-finished lens.

Viewed from the front, the basic lens of FIG. 10 will appear as a round lens as in FIG. 11 prior to being edged to a given shape, as depicted in FIG. 12. FIG. 13 is a sectional view of the lens of FIG. 12 after it has been edged. Elements 19, 20 of FIG. 13 represent scratch resistant coatings applied to surfaces 12, 13. Elements 21, 22 of FIG. 13 represent anti-reflective coatings applied to the scratch resistant coatings 19, 20. Scratch resistant coatings 19, 20 are applied by conventional methods and are preferably applied prior to edging the lens. Anti-reflective coatings 21, 22 comprise the outermost layer of the final lens, if they are desired. The lens of the present invention may be fabricated and utilized without either scratch resistant coatings 19, 20 or anti-reflective coatings 21, 22. Edges 41 of FIG. 13 represent the exposed edges of the various elements of the lens following edging. If an adhesion promoting primer 5 were not employed to secure the second lens element 7 to the reflective medium 4, the lens element 7 would delaminate from the reflective medium 4 following edging of the lens.

Referring now to FIG. 14, there is shown the basic lens fabricated using a colored insert lens element 3. The difference between the basic lens of FIG. 14 and the lens 17 of FIG. 2 is the insert lens element 3. Instead of incorporating a polarized film in the insert lens element 3, the insert lens element 3 of FIG. 14 is fabricated of colored plastic material.

That is to say, a special dye is added to the plastic prior to curing it. Colored plastic material, such as allyl diglycol carbonate, is well known in the optical industry. The purpose of using colored plastic material is to provide meaningful light absorption, the same function as that of the polarized film previously described.

As previously described, insert lens element 3 may be fabricated as a polarized lens or with a non-polarized film, and colored or uncolored. If it is fabricated from uncolored plastic material, then an additional step of adding a light absorbing tint to the lens should be accomplished. This may be by way of a vacuum deposited tint that is well known in the industry or by way of a dye added to the plastic material after curing. Conventional dyes are readily commercially available in liquid form and are widely used for tinting plastic lenses.

Referring now to FIGS. 15 and 16, there are shown two lenses incorporating insert lens elements 3 fabricated of unclolored plastic material. Instead of using a film or colored plastic material to provide meaningful light absorption, the lenses of FIGS. 15 and 16 employ vacuum deposited tints. Vacuum deposited tints are typically made of magnesium fluoride or a silicon type medium. The incorporation of vacuum deposited tints in a lens including a first lens having a relief pattern on one surface, wherein the relief pattern is a holographic surface relief pattern having a reflective medium applied thereon, is the subject of U.S. Pat. No. 4,840,444. This prior art does not, however, describe the use of tints that are incorporated into a lens that does not inherently cause optical distortion.

If a vacuum deposited tint is used, the preferred method is to apply the tint prior to applicaton of the primer element as described hereinabove. FIGS. 15 and 16 represent two ways in which a vacuum deposited tint may be incorporated into a lens. FIG. 15 illustrates a vacuum deposited tint 42 positioned between the reflective medium 4 and the insert lens element 3. This is accomplished, during the vacuum deposition process, by first depositing the light absorbing medium onto the surface of the relief pattern 11 of the insert lens element 3. The reflective medium 4 is then deposited onto the surface of the vacuum deposited tint coating. FIG. 16 illustrates the vacuum deposited tint 42 as being applied to surface 9, opposite the reflective medium, of insert lens element 3.

The process of using dyes to tint a lens made of a thermoset plastic material, such as allyl diglycol carbonate, is well known in the industry. Conventional dyes are available from Brain Power Incorporated. Conventional tinting methods involves submerging a plastic lens in a container of heated dye mixture. All exposed surfacs of the lens absorb dye. Using a conventional tinting method, a tint 43 is absorbed into surface 13 of FIG. 17. Prior to adding tint 43 to surface 13, a non-tintable coating 44 is preferably applied to surface 12 for the purpose of sealing surface 12 from the tint during the tinting process. As a result, tint will not be absorbed on the oberver's side of the lens depicted. Application of non-tintable coatings is well known in the optical industry. An alternate method for adding tint to the lens of FIG. 17 involves vacuum depositing tint on surface 13. As used herein the term meaningful light absorbing tint refers to tint incorporated into a lens for the purpose of adding functionality to the lens and for providing protection from bright light. Colored tints, such as red, blue or yellow may also be added to the lens for aesthetic purposes. Colored tints added for the purpose of aesthetics will work to absorb light as well. However, for the purpose of illustration, it is not these tints that are considered to be meaningful in terms of absorbing light for protection from bright light.

The light absorbing tint is situated between the eye of the wearer and the reflective medium 4. If polarized film or colored plastic is incorporated in the insert lens element 3, surface 11 of the polarized or colored insert lens element 3 of FIG. 2, opposite the wearer's side 9, will incorporate both the reflective medium 4 and the desired relief pattern. If using vacuum deposited tints or conventional dye tints in conjunction with a reflective medium such as chromium, it does not matter which side of the insert lens element 3 is textured and given the reflective medium 4, so long as the tint is situated between the reflective medium 4 and the eye of the wearer. For example, if the insert lens element 3 is uncolored, the relief pattern and reflective medium 4 can be on the concave side 9 of the insert lens element 3 of FIG. 5, in which case a vacuum deposited tint would be deposited onto the reflective medium 4.

In addition to the insert lens method of lens construction described hereinabove, the base lens method may also be employed. The base lens method utilizes a method of fabricating prescription eyeglasses that is commonly referred to as surface casting. However, this prior art casting method has not been employed in the fabrication of a multi-layer lens of the type that is the subject of the present invention. Furthermore, prior art surface casting methods have not involved an adhesion promoting element to improve bonding between lens elements or the encapsulation of reflective mediums. Rather, the prior art surface casting methods have relied on molecular bonding between optical plastics to hold the various lens elements together, a technique that is indadequate for fabricating the lens elements of the present invention.

The following is a description of the process of fabrication of the basic lens depicted in FIG. 18. As used herein, surface casting refers to casting onto only one surface of the first lens element which, according to the present invention, is the surface of the first lens element that incorporates the reflective coated relief pattern.

The first step in the present surface casting method involves fabrication of a first lens element 3 of FIG. 18, referred to as a base lens element. The base lens element 3 is fabricated of a thermoset plastic material, such as allyl diglycol carbonate and may be case using the same type of mold assembly as described hereinabove. Base lens element 3 has a relief pattern surface 11 on one side and an optically smooth surface 9 on the opposite side. Relief pattern surface 11 is convex, while surface 9 is concave. Base lens element 3 may be cast using any one of the previously described methods. That is, it may be polarized, with a tinted non-polarized film, colored or uncolored. As illustrated in FIG. 18, base lens element 3 is approximately 2 millimeters in thickness and incorporates a polarized film 18.

The second step in the present surface casting method is to apply a reflective medium 4, in accordance with the detailed description set forth above, to the relief pattern surface 11.

The third step in the present surface casting method involves application of a primer element 5, of the type previously described, to the surface of the reflective medium 4. Spin coating is the preferred method of applying primer element 5, because only the reflective medium 4 is to be primer coated. Following application of reflective medium 4 and primer element 5, base lens element 3 is referred to as a prepared base lens element.

The fourth step in the present surface casting method is somewhat similar to the same step described above in connection with the insert lens method of fabrication in that a second lens element 7 is cast onto primer element 5 of the prepared base lens element. The molding system employed in casting lens element 7 of FIG. 18 requires the use of only a first mold. The first mold is similar to the first mold 36 of FIG. 8. The first mold serves to provide an optically smooth concave surface for the prepared base lens element to be cast against. This is accomplished by placing the first mold on a horizontal surface with the concave portion of the mold facing upward. Uncured thermoset plastic material is poured onto the concave molding surface of the first mold. The convex side of the prepared base lens element of FIG. 18 is set against the concave molding surface of the first mold. The uncured plastic material is allowed to flow outwardly between the coated surface of the prepared base lens element and the optically smooth concave surface of the first mold. After the thermoset plastic material has been cured by a conventional heat process, the basic lens structure is complete and can then be removed from the first mold. The basic lens structure may now be processed in the same way described above in connection with the basic lens structure of FIG. 10. The methods described above for adding a light absorbing tint may be applied to the basic lens structure fabricated using the base lens method.

The result of the foregoing casting process is that the peaks and valleys of the relief pattern surface 11 are filled in by lens element 7 of FIG. 18, and the prepared base lens element is given a new outer surface 12 that is optically smooth. Surfaces 9 and 12 of FIG. 18 are both optically smooth and form the outer concave and convex surfaces, respectively. The plastic material employed to fabricate lens element 7 is the same type of material employed to fabricate base lens element 3. The thickness of lens element 7 is approximately 0.1–0.2 millimeters. The only restriction on the thickness of lens element 7 is that it must be sufficiently thick to fill in the relief pattern surface 11 and provide an optically smooth outer surface 12. By employing the base lens method just described, the lens structure of FIG. 18 can be made to have a final edge thickness of 2.2 millimeters or less. As described above in connection with the insert lens method of fabrication, the primary objective when using the base lens method is to cast the lens structure to have no magnification. However, as with the insert lens method, the base lens method may also be employed to fabricate a corrective type lens having a desired degree of magnification. Using the base lens method to cast the lens of FIG. 18 as a thin lens of the corrective type simply requires the use of molds that have molding surfaces of the appropriate spherical diameter. It should be noted, however, that the objective of the surface casting, as described in connection with the present invention, is to fill in the relief pattern and to provide a new optically smooth outer surface, not for fabricating prescription eyeglasses.

The base lens method of the present invention facilitates the fabrication of semi-finished lenses, requiring only that the base lens element 3 of FIG. 18 be of a desired thickness. When using the base lens method, in which only one surface is cast on, the relief pattern and associated primer element 5 and reflective medium 4 may just as easily be on the concave or rear side 9 of FIG. 18 of the base lens element, in which case surface 11 would be optically smooth. In this case, the second lens element would be cast onto side 9. Whether the primer element 5 and the reflective medium 4 are on the concave or the convex surface of the base lens element depends on whether the base lens element is made of colored plastic material, uncolored plastic material, is polarized, or includes a tinted non-polarized film. In all cases the meaningful light absorbing tint is to be situated between the eye of the wearer and the reflective medium 4. Additionally, this method is not restricted to fabricating spherical lenses, but may also be employed to fabricate a flat lens.

An alternative method for fabricating the lenses described above according to the insert lens method and the base lens method involves a different process fo causing the second lens element to adhere to the reflective medium 4. Instead of applying the adhesion promoting primer element 5 to the surfaces, as described, an adhesion promoting additive is added directly to and mixed with the thermoset plastic material prior to applying and subsequently curing the thermoset plastic material. Adding an adhesion promoting additive to uncured thermoset plastic gives the plastic material the ability to adhere to the reflective medium 4 without the need for an additional primer element 5. As in the case of the primer element 5, adding an adhesion additive to the thermoset plastic material allows the lens to be fabricated without the use of epoxies or adhesives.

Thermoset plastic materials, intended to be cast inside of a mold, are obviously designed to not adhere to the mold in which the thermoset plastic material is being cast. Thermoset plastic materials have also been found to not adhere to materials typically used as reflective mediums. That characteristic defines the need for the additional adhesion promoting primer element 5, as described above. If, however, an adhesion promoting additive is added to the thermoset plastic material, tests have shown that the thermoset plastic material will adhere to both the reflective medium and the mold in which the plastic material is being cast. Tests have also shown that the thermoset plastic material, treated with an adhesion promoting additive prior to curing, can adhere to the mold so vigorously that the cast article cannot be removed from the mold. Therefore, if an adhesion promoting additive is added to the thermoset plastic material, a mold release element must be applied to the molding surfaces prior to casting the treated thermoset plastic material.

The idea of pre-coating a mold has been described in the prior art in which the objective has been to incorporate a specific type of coating, such as an anti-reflective coating or a scratch resistant coating, into the surface of the cast lens at the point of being cast. The prior art does not, however, teach the use of a mold release element for the purpose of keeping the treated thermoset plastic material from becoming permanently bonded to the mold in which the plastic material is being cast. It is believed that the present invention represents the first use of an adhesion promoting additive in a thermoset plastic material for the purpose of enhancing the ability of the thermoset plastic material to adhere to other lens elements, such as a reflective medium. It is also believed that the present invention represents the first use of a mold release element in a mold assembly to prevent a thermoset plastic material from becoming bonded to the mold in which the plastic material is being cast.

The following is a description of a method of treating a thermoset plastic material with an adhesion promoting additive. The preferred thermoset plastic material is allyl diglycol carbonate, commonly known as CR-39, which is a product of PPG. The preferred adhesion promoting additive is the same type of silane used to fabricate the previously described adhesion promoting primer. Instead of applying the silane to the surface of the reflective medium as a separate layer of primer, as previously described, the silane is added, in liquid form, to the thermoset plastic prior to curing. Two types of silanes have been successfully tested: Dynasylan Glymo manufactured by Huls America and Z6032 manufactured by Dow Corning. As previously described, these silanes are typically provided in liquid form. The silane, in concentrated form, is preferably added to the thermoset plastic material in the ratio of 3–5 parts silane per 100 parts of thermoset plastic material. The silane added to and mixed with the thermoset plastic material represents a treated thermoset plastic material. The treated thermoset plastic material is only used to fabricate the second lens element 7 of FIGS. 10 and 18. The thermoset plastic material from which the first lens element is fabricated is not treated with an adhesion promoter because the first lens element is not required to bond to a reflective medium during the casting process.

The following is a description of the way in which a mold release element is employed. A common type of scratch resistant coating is applied by spin coating to the molding surface of a mold and is then cured by ultra violet light. The mold may be any type of glass or metal mold commonly used for casting lenses. One acceptable type of scratch resistant coating that is designed to adhere to plastic is the non-tintable HT-125B manufactured by Lens Technology of Cerritos, Calif. The scratch resistant coating conforms to the optically smooth surface of the mold, but does not adhere to the mold surface. When employing the insert lens method, the molding surfaces of both the first and second mold must have a mold release element applied thereon. When employing the base lens method, the molding surface of the first mold must have a mold release element applied thereto. It should be noted that any molding surface contacted by the treated thermoset plastic material must have a mold release element applied thereto. A molding surface coated with a mold release element is referred to herein as a prepared mold.

The insert lens method, previously described, is altered in the following manner. The adhesion promoting primer element is not applied to the reflective medium 4, while the thermoset plastic material employed to cast the second lens element is treated, as described, with an adhesion promoting additive. The molding surfaces of the molds employed to fabricate the lens of FIG. 8, are prepared with the mold release element prior to assembly of the mold assembly. The remainder of the insert lens method described hereinabove is unchanged. After the treated thermoset plastic material is cured, the basic lens structure is removed from the mold assembly, and the treated thermoset plastic material is bonded to all surfaces of the reflective coated insert lens element and the scratch resistant coatings. Following release of the scratch resistant coatings from the mold surfaces, the basic lens structure is processed as previously described. It should be noted that the mold release element employed can limit the options for post processing of the basic lens structure. For example, if a non-tintable scratch resistant coating is employed, the coated surface of the basic lens structure cannot be tinted. The alteration of the bas lens method is similar in that an adhesion promoting primer element is not applied to the reflective medium 4. The Thermoset plastic material used to fabricate the second lens element is treated, as described, and the molding surface of the first mold must be prepared. Other suitable mold release elements may be employed to achieve the same objective of preventing the treated thermoset plastic from adhering to the mold.

An alternate method of curing the thermoset plastic material during fabrication of the first and second lens elements employs an ultra violet light source. The benefit of curing a thermoset plastic in this manner is shortened cure time. Instead of eighteen hours of cure time required for heat curing, the thermoset plastic material can be cured in about ½ hour by exposure to ultraviolet light.

Referring now to FIG. 19, there is shown a first lens element 7 fabricated of a thermoplastic material such as polycarbonate. Surface 10 of the first lens element has a relief pattern thereon, which is shown as an uneven pattern corresponding to the peaks and valleys created by the relief pattern. Surface 12 is optically smooth. The first lens element 7 may be fabricated in the form of a spherical lens element by injection molding, or it may be fabricated as a flat sheet and then thermoformed into a spherical lens shape. The well known thermoforming process involves reshaping the flat sheet under heat and pressure into a spherical lens shape. If the first lens element 7 is thermoformed, the relief pattern can be embossed onto the first lens element 7 at the time of thermoforming. First lens element 7 may be fabricated of either colored or uncolored plastic. A reflective medium 4 is applied to surface 10 of first lens element 7 in accordance with the process described hereinabove. A primer element 5 is applied to the reflective medium 4, preferably by spin coating, as previously described. The first lens element 7, following application of the reflective medium 4 and the primer element 5, is referred to as a prepared first lens element and is then placed inside of a mold.

Referring now to FIG. 20, there is shown the prepared first lens element placed inside an injection mold. A front mold 46 has a concave surface 47 that is optically smooth. Optically smooth surface 50 of a back mold 45 has a convex molding surface. Surface 12 of first lens element 7 of FIG. 19 is shown placed against surface 47 of the front mold 46. Area 48 represents a cavity defined by the convex molding surface 50, the coated surface of the first lens element 7, and the side walls of molds 45, 46. Thermoplastic material is injected under heat and pressure to fill the cavity 48 at a point 49 to fabricate lens element 3 of FIG. 21. Mold element 46 serves to hold the prepared first lens element in place and maintain its form during the injection process. The thermoplastic material confroms to the relief pattern 10 of the first lens element 7 and to the optically smooth surface of the back mold 50.

As the newly injected thermoplastic material cools, it bonds to the primer element 5. FIG. 21 illustrates the newly formed lens removed from the mold. Lens element 3, fabricated of colored plastic material, represents the thermoplastic material bonded to the primer element 5. The colored plastic material of lens element 3 provides the meaningful light absorption characteristic previously described. Surfaces 9 abnd 12 of FIG. 21 are both optically smooth and form the outer concave and convex surfaces, respectively. Lens elements 3 and 7 are both made of the same type of light transmitting thermoplastic material and, therefore, have the same refractive index. At this point in the process, the basic lens structure is complete and can now be processed in the same manner as a conventional thermoplastic lens. Such processing includes grinding to a specified presecription, edging or cutting down to fit a given frame shape, adding additional thin film coatings such as the anti-reflective and scratch resistant coatings previously described, and tinting to a desired color or light absorbing density. The foregoing method of lens construction using thermoplastic materials may be modified by placing the relief pattern and the associated primer element 5 and reflective medium 4 n the convex surface 12 of the first lens element 7 of FIG. 19. In this case, the thermoplastic material would be injected onto the convex side of the first lens element 7. The preferred method of incorporating a light absorbing tint into the thermoplastic lens structure is to use pre-colored thermoplastic material, and is applicable to fabrication of both spherical and flat lenses.

I claim:

1. A lens structure that reflects light impinging thereon in a purposefully scattered manner, while allowing a portion of said light to pass through said lens structure in a coherent manner, the lens structure comprising:
    a first lens element having first and second surfaces, said first surface having a relief pattern thereon, said relief pattern comprising three-dimensional surface variations;
    a reflective medium of substantially uniform thickness applied to said first surface such that said reflective medium conforms to said relief pattern;
    a second lens element applied to said reflective medium and to said second surface of said first lens element, said second lens element having third, fourth, fifth, and sixth surfaces, said fifth surface of said second lens element conforming to the surface of said reflective medium, said fifth surface of said second lens element filling in and substantially conforming to the three-dimensional surface variations of said relief pattern of said first surface, said sixth surface of said second lens element conforming to said second surface of said first lens element, and said third and fourth surfaces of said second lens element forming outer surfaces of said lens structure.

2. A lens structure as in claim 1 wherein:
    said first surface of said first lens element is adjacent to said third surface of said second lens element; and
    said second surface of said first lens element is adjacent to said fourth surface of said second lens element.

3. A lens structure as in claim 1 wherein said first lens element having said reflective medium thereon is encapsulated within said second lens element.

4. A lens structure as in claim 1 wherein said third and fourth surfaces of said second lens element are optically smooth.

5. A lens structure as in claim 1 wherein said relief pattern comprises a brushed finish.

6. A lens structure as in claim 1 wherein said relief pattern comprises a matte finish.

7. A lens structure as in claim 1 wherein said relief pattern on said first surface of said first lens element comprises a desired pattern.

8. A lens structure as in claim 1 wherein:
    said reflective medium is applied by means of vacuum deposition; and
    said reflective medium is sufficiently thin and sparingly applied such that only a fraction of the light impinging thereon is reflected, the remainder passing through said lens structure.

9. A lens structure as in claim 1 wherein said first and second lens elements comprise a plastic molding material.

10. A lens structure as in claim 1 wherein said first lens element comprises a thermoset plastic material.

11. A lens structure as in claim 1 wherein said second lens element comprises a thermoset plastic material.

12. A lens structure as in claim 10 wherein said first and second lens elements comprise a like type of thermoset plastic material.

13. A lens structure as in claim 12 wherein said thermoset plastic material comprises allyl diglycol carbonate.

14. A lens structure as in claim 11 wherein said thermoset plastic material is treated with an adhesion promoting additive which causes said thermoset plastic material to adhere to said reflective medium when cured.

15. A lens structure as in claim 14 wherein said adhesion promoting additive comprises a silane.

16. A lens structure as in claim 1 further comprising an adhesion promoting element applied between said fifth surface of said second lens element and said reflective medium for providing a surface to which said second lens element is bonded.

17. A lens structure as in claim 1 further comprising an adhesion promoting element applied between said sixth surface of said second lens element and said second surface of said first lens element for providing a surface to which said sixth surface of said second lens element is bonded.

18. A lens structure as in claim 1 further comprising a tint element applied between said first surface of said first lens element and said reflective medium to provide a light absorbing tint to said lens structure.

19. A lens structure as in claim 1 further comprising a tint element applied between said fifth surface of said second lens element and said reflective medium to provide a light absorbing tint to said lens structure.

20. A lens structure as in claim 19 further comprising an adhesion promoting element applied between said tint element and said fifth surface of said second lens element for providing a surface to which said fifth surface of said second lens element is bonded.

21. A lens structure as in claim 1 further comprising a tint element applied between said second surface and said sixth surface of said second lens element to provide a light absorbing tint to said lens structure.

22. A lens structure as in claim 21 further comprising an adhesion promoting element applied between said tint element and said sixth surface of said second lens element for providing a surface to which said sixth surface of said second lens element is bonded.

23. A lens structure as in claim 18 wherein said tint element comprises a metallic material of substantially uniform thickness that is applied by vacuum deposition.

24. A lens structure as in claim 19 wherein said tint element comprises a metallic material of substantially uniform thickness that is applied by vacuum deposition.

25. A lens structure as in claim 21 wherein said tint element comprises a metallic material of substantially uniform thickness that is applied by vacuum deposition.

26. A lens structure as in claim 18 wherein said tint element comprises a silicon material of substantially uniform thickness that is applied by vacuum deposition.

27. A lens structure as in claim 19 wherein said tint element comprises a silicon material of substantially uniform thickness that is applied by vacuum deposition.

28. A lens structure as in claim 21 wherein said tint element comprises a silicon material of substantially uniform thickness that is applied by vacuum deposition.

29. A lens structure as in claim 16 wherein said adhesion promoting element comprises a non-tacky, solid state thin film of substantially uniform thickness.

30. A lens structure as in claim 17 wherein said adhesion promoting element comprises a non-tacky, solid state thin film of substantially uniform thickness.

31. A lens structure as in claim 20 wherein said adhesion promoting element comprises a non-tacky, solid state thin film of substantially uniform thickness.

32. A lens structure as in claim 22 wherein said adhesion promoting element comprises a non-tacky, solid state thin film of substantially uniform thickness.

33. A lens structure as in claim 29 wherein said adhesion promoting element comprises a silane.

34. A lens structure as in claim 30 wherein said adhesion promoting element comprises a silane.

35. A lens structure as in claim 31 wherein said adhesion promoting element comprises a silane.

36. A lens structure as in claim 32 wherein said adhesion promoting element comprises a silane.

37. A lens structure as in claim 1 further comprising a polarizing film within said first lens element for providing a light absorbing tint to said lens structure.

38. A lens structure as in claim 1 further comprising a colored film within said first lens element for providing a light absorbing tint to said lens structure.

39. A lens structure as in claim 1 wherein said first lens element comprises a colored plastic material for providing a light absorbing tint to said lens structure.

40. A lens structure as in claim 1 further comprising an anti-reflective coating applied to said third surface of said second lens element.

41. A lens structure as in claim 1 further comprising an anti-reflective coating applied to said fourth surface of said second lens element.

42. A lens structure as in claim 1 further comprising an anti-reflective coating applied to each of said third and fourth surfaces of said second lens element.

43. A lens structure as in claim 1 further comprising a scratch resistant coating applied to each of said third and fourth surfaces of said second lens element.

44. A lens structure as in claim 40 further comprising a scratch resistant coating applied to said third surface of said second lens element before applying said anti-reflective coating.

45. A lens structure as in claim 41 further comprising a scratch resistant coating applied to said fourth surface of said second lens element before applying said anti-reflective coating.

46. A lens structure as in claim 42 further comprising a scratch resistant coating applied to each of said third and fourth surfaces of said second lens element before applying said anti-reflective coating.

47. A lens structure that reflects light impinging thereon in a purposefully scattered manner, while allowing a portion of said light to pass through said lens structure in a coherent manner, the lens structure comprising:

a first lens element having first and second surfaces, said first surface having a relief pattern thereon, said relief pattern comprising three-dimensional surface variations;

a reflective medium of substantially uniform thickness applied to said first surface such that said reflective medium conforms to said relief pattern;

an adhesion promoting element of substantially uniform thickness applied to said reflective medium, said adhesion promoting element conforming to said reflective medium;

a second lens element applied to a surface of said adhesion promoting element, said second lens element having third and fourth surfaces, said fourth surface of said second lens element conforming to the surface of said adhesion promoting element, said fourth surface of said second lens element filling in and substantially conforming to the three-dimensional surface variations of said relief pattern of said first surface, said second and third surfaces forming outer surfaces of said lens structure.

48. A lens structure as in claim 47 wherein said first surface of said first lens element is adjacent to said third surface of said second lens element.

49. A lens structure as in claim 47 wherein said second and third surfaces are optically smooth.

50. A lens structure as in claim 47 wherein said relief pattern comprises a brushed finish.

51. A lens structure as in claim 47 wherein said relief pattern comprises a matte finish.

52. A lens structure as in claim 47 wherein said relief pattern on said first surface of said first lens element comprises a desired pattern.

53. A lens structure as in claim 47 wherein:

said reflective medium is applied by means of vacuum deposition; and said reflective medium is sufficiently thin and sparingly applied such that only a fraction of the light impinging thereon is reflected, the remainder passing through said lens structure.

54. A lens structure as in claim 47 wherein said first and second lens elements comprise a plastic molding material.

55. A lens structure as in claim 54 wherein said plastic molding material is of the same type for both said first and second lens elements.

56. A lens structure as in claim 55 wherein said plastic molding material comprises a thermo plastic molding material.

57. A lens structure as in claim 55 wherein said plastic molding material comprises a thermoset plastic material.

58. A lens structure as in claim 57 wherein said thermoset plastic material comprises allyl diglycol carbonate.

59. A lens structure as in claim 47 wherein said adhesion promoting element is applied to said reflective medium for providing a surface to which said fourth surface of said second lens element is bonded.

60. A lens structure as in claim 47 wherein said adhesion promoting element comprises a non-tacky, solid state thin film of substantially uniform thickness.

61. A lens structure as in claim 60 wherein said adhesion promoting additive comprises a silane.

62. A lens structure as in claim 47 further comprising a tint element applied between said first surface of said first lens element and said reflective medium to provide a light absorbing tint to said lens structure.

63. A lens structure as in claim 47 further comprising a tint element applied between said adhesion promoting element and said reflective medium to provide a light absorbing tint to said lens structure.

64. A lens structure as in claim 62 wherein said tint element comprises a metallic material of substantially uniform thickness that is applied by vacuum deposition.

65. A lens structure as in claim 63 wherein said tint element comprises a metallic material of substantially uniform thickness that is applied by vacuum deposition.

66. A lens structure as in claim 62 wherein said tint element comprises a silicon material of substantially uniform thickness that is applied by vacuum deposition.

67. A lens structure as in claim 63 wherein said tint element comprises a silicon material of substantially uniform thickness that is applied by vacuum deposition.

68. A lens structure as in claim 47 further comprising a polarizing film within said first lens element for providing a light absorbing tint to said lens structure.

69. A lens structure as in claim 47 further comprising a colored film within said first lens element for providing a light absorbing tint to said lens structure.

70. A lens structure as in claim 47 wherein a selected one of said first and second lens elements comprise a colored plastic material for providing a light absorbing tint to said lens structure.

71. A lens structure as in claim 47 further comprising an anti-reflective coating applied to said second surface of said first lens element.

72. A lens structure as in claim 47 further comprising an anti-reflective coating applied to said third surface of said second lens element.

73. A lens structure as in claim 47 further comprising an anti-reflective coatings applied to said second surface of said first lens element and to said third surface of said second lens element.

74. A lens structure as in claim 47 further comprising a scratch resistant coating applied to said second surface of said first lens element and to said third surface of said second lens element.

75. A lens structure as in claim 71 further comprising a scratch resistant coating applied to said second surface of said first lens element and to said third surface of said second lens element before applying said anti-reflective coating.

76. A lens structure as in claim 72 further comprising a scratch resistant coating applied to said second surface of said first lens element and to said third surface of said second lens element before applying said anti-reflective coating.

77. A lens structure as in claim 73 further comprising a scratch resistant coating applied to said second surface of said first lens element and to said third surface of said second lens element before applying said anti-reflective coating.

78. A lens structure that reflects light impinging thereon in a purposefully scattered manner, while allowing a portion of said light to pass through said lens structure in a coherent manner, the lens structure comprising:

a first lens element comprising a moldable plastic material and having first and second surfaces, said first surface having a relief pattern thereon, said relief pattern comprising three-dimensional surface variations;

a reflective medium of substantially uniform thickness applied to said first surface such that said reflective medium conforms to said relief pattern;

a second lens element comprising a moldable plastic material containing an adhesion promoting material, said second lens element being applied to a surface of said reflective medium, said second lens element having third and fourth surfaces, said fourth surface of said second lens element conforming to the surface of said reflective medium, said fourth surface of said second lens element filling in and substantially conforming to the three-dimensional surface variations of said relief pattern of said first surface, said second and third surfaces forming outer surfaces of said lens structure.

79. A lens structure as in claim 78 wherein said first surface of said first lens element is adjacent to said third surface of said second lens element.

80. A lens structure as in claim 78 wherein said second and third surfaces are optically smooth.

81. A lens structure as in claim 78 wherein said adhesion promoting material enables said second lens element to adhere to said reflective medium.

82. A lens structure as in claim 81 wherein said adhesion promoting material comprises a silane.

83. A lens structure as in claim 78 wherein said moldable plastic material comprises a thermoset plastic material.

84. A lens structure as in claim 83 wherein said thermoset plastic material comprises allyl diglycol carbonate.

85. A lens structure as in claim 78 wherein said relief pattern comprises a brushed finish.

86. A lens structure as in claim 78 wherein said relief pattern comprises a matte finish.

87. A lens structure as in claim 78 wherein said relief pattern comprises a desired pattern.

88. A lens structure as in claim 78 wherein:

said reflective medium is applied by means of vacuum deposition; and said reflective medium is sufficiently thin and sparingly applied such that only a fraction of the light impinging thereon is reflected, the remainder passing through said lens structure.

89. A lens structure as in claim 78 further comprising a tint element applied between said first surface of said first lens element and said reflective medium to provide a light absorbing tint to said lens structure.

90. A lens structure as in claim 78 further comprising a tint element applied between said fourth surface of said second lens element and said reflective medium to provide a light absorbing tint to said lens structure.

91. A lens structure as in claim 89 wherein said tint element comprises a metallic material of substantially uniform thickness that is applied by vacuum deposition.

92. A lens structure as in claim 90 wherein said tint element comprises a metallic material of substantially uniform thickness that is applied by vacuum deposition.

93. A lens structure as in claim 89 wherein said tint element comprises a silicon material of substantially uniform thickness that is applied by vacuum deposition.

94. A lens structure as in claim 90 wherein said tint element comprises a silicon material of substantially uniform thickness that is applied by vacuum deposition.

95. A lens structure as in claim 78 further comprising a polarizing film within said first lens element for providing a light absorbing tint to said lens structure.

96. A lens structure as in claim 78 further comprising a colored film within said first lens element for providing a light absorbing tint to said lens structure.

97. A lens structure as in claim 78 wherein said moldable plastic material comprising a selected one of said first and second lens elements is a pre-colored moldable plastic material to provide a light absorbing tint to said lens structure.

98. A lens structure as in claim 78 further comprising an anti-reflective coating applied to said second surface of said first lens element.

99. A lens structure as in claim 78 further comprising an anti-reflective coating applied to said third surface of said second lens element.

100. A lens structure as in claim 78 further comprising an anti-reflective coating applied to said second surface of said first lens element and to said third surface of said second lens element.

101. A lens structure as in claim 78 further comprising a scratch resistant coating applied to said second surface of said first lens element and to said third surface of said second lens element.

102. A lens structure as in claim 98 further comprising a scratch resistant coating applied to said second surface of said first lens element and to said third surface of said second lens element before applying said anti-reflective coating.

103. A lens structure as in claim 99 further comprising a scratch resistant coating applied to said second surface of said first lens element and to said third surface of said second lens element before applying said anti-reflective coating.

104. A lens structure as in claim 100 further comprising a scratch resistant coating applied to said second surface of said first lens element and to said third surface of said second lens element before applying said anti-reflective coating.

* * * * *